(12) United States Patent
Shoji et al.

(10) Patent No.: US 6,520,861 B2
(45) Date of Patent: Feb. 18, 2003

(54) ENTERTAINMENT APPARATUS, STORAGE MEDIUM, AND METHOD OF DISPLAYING AN OBJECT

(75) Inventors: Mitsunori Shoji, Tokyo; Kouichi Abe, Kyoto; Izumi Fukuda, Nagasaki; Yasuhiko Fujii, Kyoto; Shigeru Okita, Nagasaki; Hiroyuki Seki, Nagasaki; Makoto Eguchi, Nagasaki; Hideki Morinaga, Nagasaki; Masaki Hirabayashi, Tokyo, all of (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/816,502

(22) Filed: Mar. 21, 2001

(65) Prior Publication Data

US 2002/0091005 A1 Jul. 11, 2002

(30) Foreign Application Priority Data

Mar. 21, 2000 (JP) .................... 2000-078550

(51) Int. Cl.$^7$ ................................. A63J 5/02
(52) U.S. Cl. .................... 472/65; 434/217; 472/61
(58) Field of Search .............. 472/59, 60, 61, 472/65, 137; 434/29, 49, 106, 130, 144, 149, 217, 307 R, 314

(56) References Cited

U.S. PATENT DOCUMENTS

| | | | | | |
|---|---|---|---|---|---|
| 2,455,210 A | * | 11/1948 | Anderson | ............... | 340/286.14 |
| 2,513,465 A | * | 7/1950 | Fisk | ............... | 368/21 |
| 2,567,189 A | * | 9/1951 | Davis | ............... | 340/286.13 |
| 2,628,442 A | * | 2/1953 | Blewett | ............... | 116/320 |
| 2,683,946 A | * | 7/1954 | Olson | ............... | 235/70 R |
| 5,480,305 A | * | 1/1996 | Montag et al. | ............... | 434/2 |

FOREIGN PATENT DOCUMENTS

| | | |
|---|---|---|
| JP | 2000 066571 | 3/2000 |
| WO | WO 96/16379 | 5/1996 |
| WO | WO 97/03417 | 1/1997 |

OTHER PUBLICATIONS

L. Hembree et al.; "Incorporation of a Cloud Simulation into a Flight Mission Rehearsal System: Prototype Demonstration"; *Bulletin of the American Meteorological Society*; vol. 78, No. 5; pp. 815–822; (May 1997).

U.S. patent application Ser. No. 09/815,996, Shoji et al., filed Mar. 21, 2001.

* cited by examiner

*Primary Examiner*—Kien T. Nguyen
(74) *Attorney, Agent, or Firm*—Fitch, Even, Tabin & Flannery

(57) ABSTRACT

More reality is given to weather phenomena reflected on an image displayed on a screen of a display unit and an operability of an operatable object. A global weather deciding part 901 decides weather in each global area obtained by dividing the whole map of a virtual world into a plurality of global areas. The weather in the global a area in question is decided at intervals of a first time, in accordance with a preset behavior model and considering area information of each global area in advance. A local weather deciding part 902 decides weather in each local area obtained by dividing each global area into a plurality of local areas. The weather in the local area in question is decided at intervals of a second time, which is shorter than the first time, in accordance with the weather of the global area concerned decided by the global weather deciding part 901, and considering area information of each local area.

16 Claims, 17 Drawing Sheets

$(P_1-P_2)/l > \alpha \rightarrow$ SET AS A HIGH PRESSURE MODEL $(P_1-P_2)/l < -\alpha \rightarrow$ SET AS A LOW PRESSURE MODEL HERE, L IS THE AVERAGE NUMBER OF AREAS RANGING FROM
THE INNERMOST PRESSURE LINE TO THE OUTERMOST PRESSURE LINE

ENTERTAINMENT APPARATUS, STORAGE MEDIUM, AND METHOD OF DISPLAYING AN OBJECT

BACKGROUND OF THE INVENTION

1. Field of the Invention

The present invention relates to a technique of deciding weather of an image of a virtual world displayed on a screen of a display unit.

2. Related Art Statement

Recently, entertainment apparatuses such as a television game machine, which can perform flight simulation, drive simulation, etc. utilizing 3D graphics animation, become popular.

In this kind of entertainment apparatus, an operator uses an operating unit connected to that apparatus to operate an operatable object such as an airplane or car, to move the object everywhere in a virtual world. That entertainment apparatus generates a dynamic image obtained by taking a picture of the operatable object moving in this virtual world by a virtual camera, and displays the dynamic image on a screen of a display unit connected to that apparatus.

SUMMARY OF THE INVENTION

In the conventional entertainment apparatus that can perform flight simulation, drive simulation, etc., weather phenomena such as cloud rate and wind are reflected on an image displayed on a screen or on operability of an operable object, to increase the entertainingness.

However, in this kind of conventional entertainment apparatus, predetermined weather phenomena are assigned to each area of the virtual world in advance. And, weather phenomena assigned to an area to which an image displayed on a screen of a display unit belongs or an area where the operatable object is located are reflected on that image or the operability of that operatable object. Or, the predetermined weather phenomena are reflected at random on a image displayed on a screen of the display unit or the operability of the operatable object, so as to change weather phenomena as time passes.

Accordingly, in the former case, weather phenomena are fixed for each area, and an operator can not enjoy such weather change experienced in the real world. On the other hand, in the later case, weather phenomena reflected on an image displayed on a screen of the display unit or on the operability of the operatable object are changed at random, and the operator can not forecast weather coming next which he/she can bring out depending upon his/her experiences.

Thus, those techniques can not give reality to a flight simulation and a drive simulation.

Thus, an object of the present invention is to increase the entertainingness by giving acre reality to weather phenomena reflected on an image displayed on a screen of a display unit or operability of an operatable object.

To attain the mentioned object, in the present invention, weather in each global area obtained by dividing a map expressing the whole virtual world into a plurality of global areas is decided at predetermined intervals in accordance with a behavior model that sets a condition for the global area in question, and considering area information given in advance to the global area in question. The mentioned condition is decided from a cyclically-changing event. Further, weather in each local area obtained by dividing each global area into a plurality of local areas is decided at predetermined intervals in accordance with the weather of the global area in question decided as above, and considering area information given in advance to the local area in question.

Here, the condition set for each global area by the behavior model and decided from a cyclically-changing event is, for example, quantity of to sunshine per a unit time at each date and time in each global area, which is decided from one year fluctuation of quantity of sunshine owing to the revolution of the earth and one day fluctuation of quantity of sunshine owing to the rotation of the earth.

Further, the area information given in advance to each global area is, for example, general information indicating that the global area in question is land or sea. On the other, the area information given in advance to each local area includes detailed information such as the height of the local area in question, in addition to the general information indicating that the local area is land or sea.

According to the present invention weather of an arbitrary local area that belongs to an arbitrary global area is decided based on weather given to the global area in question and area information given in advance to the local area in question. Accordingly, it is possible to decide weather of an arbitrary local area considering the area information of that local area, while correlating the weather to local areas in the neighborhood of the local area in question.

Further, according to the present invention, weather of in arbitrary global area is decided based on the condition decided from the cyclically-changing event (for example, quantity of sunshine per a unit time at present day and time in the global area in question) and the area information given in advance to the global area in question. Accordingly, it is possible to cyclically change weather in each local area as in the real world.

By this, in an entertainment apparatus that can execute, for example, a flight simulation game, a drive simulation game, and the like, it is possible to give more reality to weather phenomenon by reflecting weather of a local area, which includes the location of an operatable object decided by contents of player's operation received through an operating unit, on an image of a virtual world, which includes the operatable object, displayed on a screen of a display unit, or by reflecting the weather of the local area, which includes the location of the operatable object, on the movement of the operatable object in the virtual world caused by the mentioned operating unit.

Or, when the present invention may be applied to the case in which an image obtained by photographing an arbitrary area in a virtual world using a virtual camera is only displayed on a screen of a display unit. In that case more reality can be given to a weather phenomenon refracted on an image taken by said camera, thus realizing an unprecedented entertainment apparatus.

According to the present invention, for example, a means for deciding weather in each global area at predetermined intervals comprises:

a first means for deciding a temperature, pressure and water vapor content in each global area at predetermined time intervals, based on the quantity of sunshine per a unit time at a time concerned, the area information given in advance to said global area, and last-decided temperatures, pressures, and water vapor contents of the global area in question and global areas adjacent to said global area, with said quantity of sunshine being set for the global area in question by said behavior model; and a second means for generating model expressing a global weather phenomenon located in each global area, as a global weather model, at predetermined time intervals, and based on the temperature, pressure and water vapor content in each global area, decided by said first means.

Further, a means for deciding weather in each local area at predetermined intervals comprises:

a third means for deciding a temperature, pressure and water vapor content in each local area at predetermined intervals, based on the temperature, pressure and water vapor content of a global area to which the local area in question belongs, the area information given in advance to said local area, and last-decided temperatures, pressures and water vapor contents of the local area in question and local areas adjacent to said local area; and a fourth means for generating a model expressing a local weather phenomenon located in each local area, as a local weather model, at predetermined time intervals, and based on the temperature, pressure and water vapor content in each local area, decided by said third means, the area information given in advance to said local area, and the global weather model located in said local area by said second means.

Here, the global weather phenomenon means a weather phenomenon, such as a high/low pressure area, an air current, or the like, that affects weather of the whole virtual world. Further, the local weather phenomenon means a weather phenomenon, such as cloud, rain, wind, or the like, that affects local weather.

According to the above-described arrangement, the first through fourth means can be designed separately from and independently of one another (modularization) to and burdens on the designing can be dispersed.

BEST MODE FOR CARRYING OUT THE INVENTION

Now, an embodiment of the present invention will be described.

First, hardware configuration of an entertainment apparatus according to an embodiment of the present invention will be described.

Figure 1:
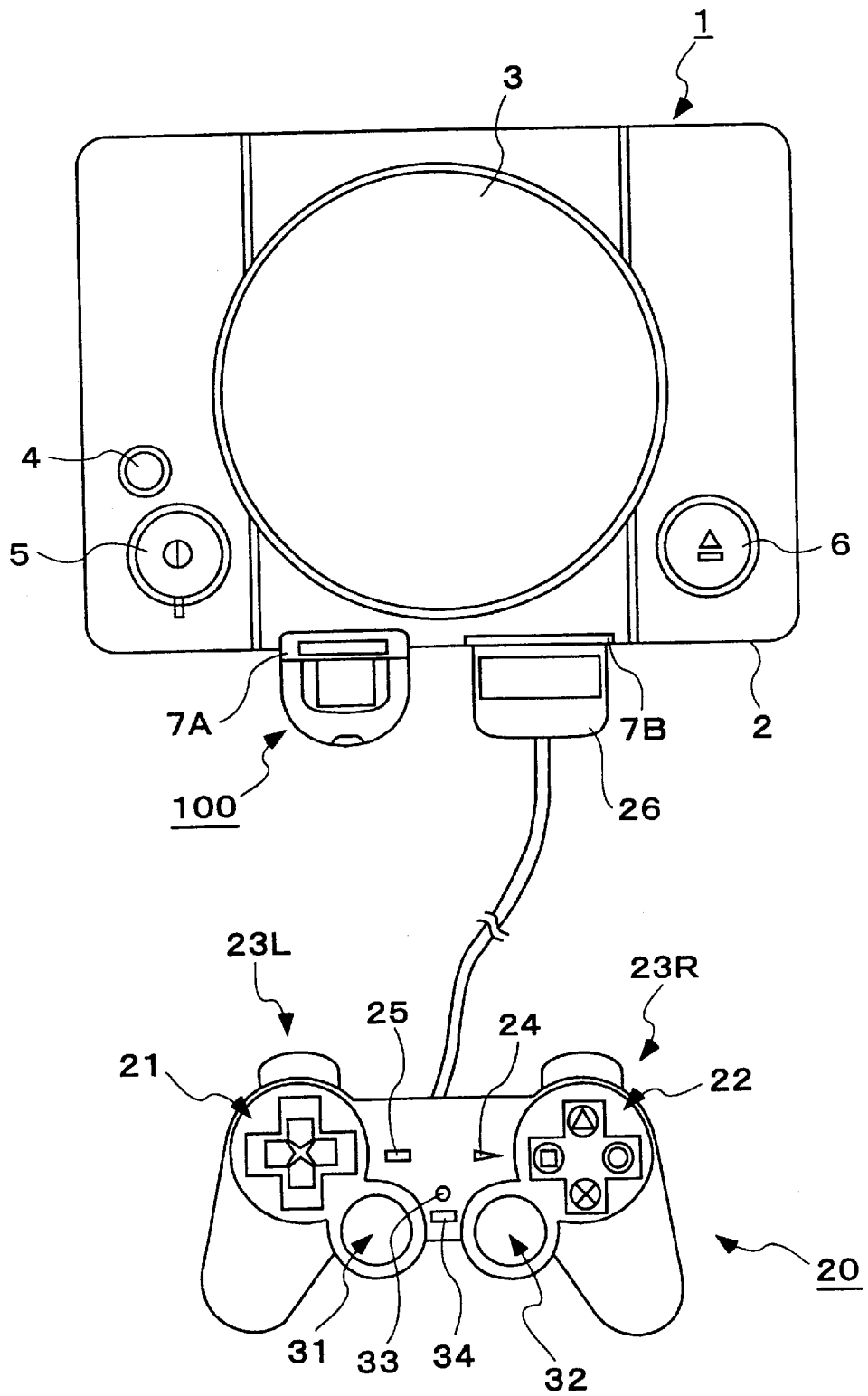
FIG. 1 is a view showing examples of appearances of an entertainment apparatus 1 and an operating unit 20 to which one embodiment of the present invention is applied.

FIG. 1 shows an appearance of the entertainment apparatus according to an embodiment of the present invention.

This entertainment apparatus reads a game program stored in an optical disk such as a CD-ROM or DVD-ROM for example, and executes the program in accordance with instructions from an operator (player). Here, the execution of the game mainly means moving an operatable object (for example, an object expressing an airplane, car, or the like), which is displayed on a display unit (for example, television) connected to the entertainment apparatus in accordance with an instruction by the player, and controlling display of a dynamic image and sound in accordance with the movement, to make the game proceed.

As shown in the figure, a main body 2 of the entertainment apparatus 1 comprises: a disk mounting part 3 in the center, to which an optical disk such as a CD-ROM or DVD-ROM as a storage medium for supplying an application program such as a television game or multimedia date is mounted a reset switch 4 for resetting a game, a power switch 5, a disk operation switch 6 for mounting operation of an optical disk, and, for example, two slots 7A and 7B.

The slots 7A and 7B can be connected with two operating units 20, so that two players can play a fighting game or competing game, for example. Further, to these slots 7A and 7B, can be mounted a memory card deviser 26 on or from which game data can be saved (stored) or read, or a portable electronic apparatus 100 that can execute a game separately from the main body 2.

The operating unit 20 comprises first and second operating parts 21 and 22, an L button 23L, an R button 23 R, a start button 24, a selection button 25, and further, an analog operating parts 31 and 32, a mode selection switch 33 for selecting an operation mode of those operating parts 31 and 32, and a display part 34 for displaying a selected operation mode.

Figure 3:
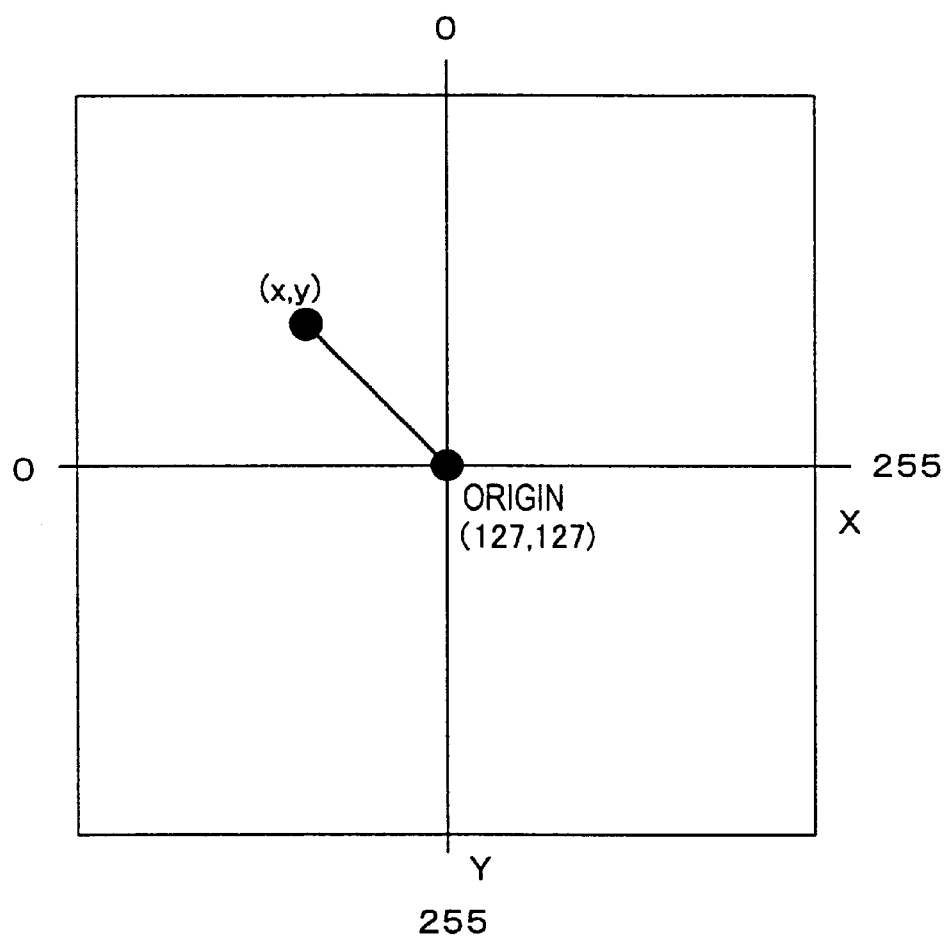
FIG. 3 is a chart for explaining what value can be inputted using operating shafts 31*a* and 32*a* of the operating unit 20 of FIG. 2.

The analog operating parts 31 and 32 have respective operating shafts 31a and 32a each constructed to be capable of inclining on a certain pivot a relative to an axis b passing the pivot a and to be capable of rotating in an inclined state. The operating unit 20 detects inclinations of the operating shafts 31a and 32b with respect to the axis b and directions of those inclinations, and outputs signals corresponding to coordinate values on the X-Y coordinate, which are, determined by those inclinations and directions of the inclinations. As shown in FIG. 3, such a coordinate value is expressed such that a value in the Y (vertical) direction is expressed by a value: of 256 steps ranging from "0" to "255" in accordance with an inclination of an operating shaft 31a or 32a in an up-and-down direction, and a value in the X (horizontal) direction is expressed by a value of 256 steps ranging from "0" on to "255" in accordance with an inclination of the operating shaft 31a or 32a in an left-and-right direction.

Figure 4:
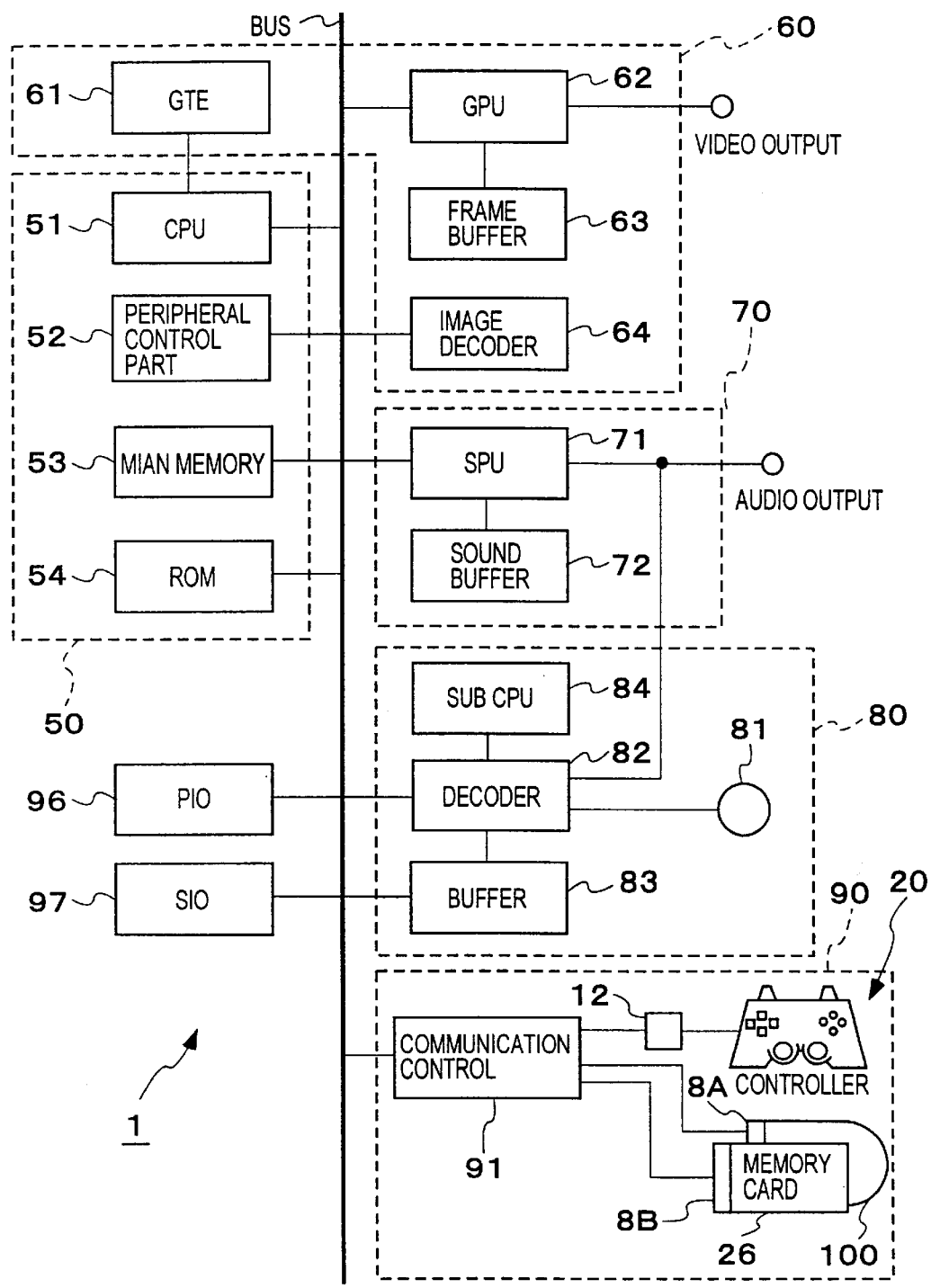
FIG. 4 is a diagram showing an example of a hardware configuration of the entertainment apparatus 1 of FIG. 1.

Next, FIG. 4 shows a configuration of the entertainment apparatus 1.

As shown in the figure, this entertainment apparatus 1 comprises: a control system 50 including a central processing unit (CPU) 51, its peripheral devices, and otter components; a graphics system 60 including a graphic processing unit (GPU) 62 for making a picture on a frame buffer 63, and other components; a sound system 70 including a sound processing unit (SPU) 71 for generating audio signals of musical sounds, sound effects, etc., and other components; an optical disk control part 80 for controlling an optical disk on which an application program or multimedia data is stored; a communication control part 90 for controlling a signal from the operating units 20 to which an instruction from an player is inputted and for controlling data input and output from a memory card 26 storing setting of a game, etc, or from a portable electronic apparatus 100; a bus BUS to which the above-mentioned components are connected; and the like.

The control system 50 comprises: the CPU 51; a peripheral control part 52 for performing interrupt control and control of direct memory access (DMA) transfer; a main memory 53 which is a random access memory (RAM); and a read only memory (ROM) 54 in which programs such as so-called operating system are stored and the programs control the main memory 53, the graphic system 60, the sound system, etc.

The CPU 51 controls the whole of the entertainment apparatus 1 by executing the operating system stored in the ROM 54, and is, for example, a RISC-CPU.

When power is applied to this entertainment apparatus 1, the CPU 51 of the control system 50 executes the operating system stored in the ROM 54. By this, the CPU 51 comes to control the graphics system 60 and the sound system 70.

Further, when the operating system is executed, the CPU 51 initializes the whole of the entertainment apparatus 1 by performing an operation test, etc., and thereafter, controls the optical disk control part 80 to execute an application program of, for example, a game stored in an optical disk by executing this program of the game, etc., the CPU 51 controls, according to inputs from a player, the graphics system 60, the sound system 70, etc. to control display of images and generation of sound effects and musical sounds.

Further, the graphics system 60 comprises: a geometry transfer engine (GTE) 61 for processing coordinate transformation etc.; the GPU 62 for making a picture in accordance with a drawing instruction from the CPU 51; a frame buffer 63 for storing an image generated by the GPU 62; and an image decoder 64 for decoding image data coded by compression according to orthogonal transformation such as the discrete cosine transformation.

The GTE 61 is provided with, for example, a parallel arithmetic unit executing a plurality of calculations in parallel, and performs matrix or vector calculation for coordinate transformation. In detail, when an application program such as a game stored in an optical disk utilizes so-called 3D graphics, this GTE 61 makes a virtual 3D object as a of triangular polygons. Further, the GTE 161 performs various calculations for generating an image that is obtained by photographing using a virtual camera, or, in other words, performs perspective transformation in the case of rendering (calculation of coordinate values on the assumption that vertexes of each polygon constituting a 3D object are projected on a virtual camera screen), for example.

Next, the GPU 62 generates an image by rendering of a 3D object on to on the frame buffer 63, using the GTE 61 if necessary, and outputs a video signal expressing the generated image. Here, as a method of removing hidden lines and surfaces in rendering, is employed the Z-buffer method, the scan line method, or the ray-tracing method, or example. As a method of shading, is employed the flat shading, Gouraud shading, or the ray-tracing method, for example. Further, as a method of expressing material and patterns of a surface of a 3D object, is employed the texture mapping, for example.

Next, the frame buffer 63 is a so-called dual port RAM, and can simultaneously perform rendering by the GPU 62 or transfer from the main memory and read for display. Further, this frame buffer 63 has a texture area in which textures used for the above-mentioned texture mapping, etc. are stored, in addition to an image area from which data is read for rendering and display.

Next, the image decoder 64 decodes image data of a static image or dynamic image stored in the main memory 53 and stored the decoded data into the main memory, being controlled by the CPU 51. By storing this reproduced image data into the frame buffer 63 through the CPU 62, the data can be used as a background of the above-mentioned image rendered by the CPU 62.

Next, the sound system 70 comprises the SPU 71 for outputting audio signals such as musical sounds and sound effects, and a sound buffer 72 into which waveform data or the like is stored by that SPU 71.

The SPU 71 has an ADPCM decoding function for reproducing audio data that has been to subjected to an adaptive prediction coding (ADPCM, Adaptive Differential PCM), a reproducing function for reproducing and outputting an audio signal such as a sound effect by reproducing waveform data stored in the sound buffer 72, and a modulating function for modulating and reproducing waveform data stored in the sound buff or 72. Owing to those functions, this sound system 70 is constructed to generate an audio signal such as a musical sound and sound effect based on waveform data stored in the sound buffer 72 in accordance with an instruction from the CPU 51, or, in other words, can be used as a so-called sampling sound source.

Next, the optical disk control, part 80 comprises: an optical disk apparatus 81 for reproducing a program, data, or the like stored in an optical disk; a decoder 82 for decoding, for example, a program, data, or the like that is recorded being added with error correction codes (ECC) for example;

and a buffer 83 for temporally storing data from the optical disk apparatus 81 in order to accelerate data reading from an optical disk. The decoder 82 is connected with a sub CPU 84.

Here, as audio data stored in an optical disk and read by the optical disk apparatus 81, may be mentioned so-called PCM) data obtained by analog-digital conversion of an audio signal, in addition to the above-mentioned ADPCM data. ADPCM data is decoded by the decoder 82, and thereafter, supplied to the SPU 71. After the data is subjected to processing such as digital-analog conversion in the SPU 71, it is outputted as a musical sound, sound effect, etc. from an acoustic system such as an audio equipment connected to this entertainment apparatus 1. PCM data is subjected to processing such as digital-analog conversion in the SPU 71, and thereafter, similarly outputted as a musical sound, sound effect, etc. from the acoustic system.

Next, the communication control part go comprises a communication controller 91 for controlling communication with the CPU 51 through the bus BUS. The communication controller 91 comprises: an operating unit connecting part 12 to which the operating unit 20 for inputting an instruction from a player is connected and memory card inserting parts 8A and 8B to each of which is connected a memory card 26 or a portable electronic apparatus 100 as auxiliary storage for storing, for example, setting data of a game.

In order to input an instruction from an player, the operating unit 20 connected to the operating unit connecting part 12 transmits a state of the above-mentioned buttons and operating parts to the communication controller 91 by means of synchronous communication, in accordance with an instruction from the communication controller 91. Then, the communication controller 91 transmits the state of the buttons and operating parts of the operating unit 20 to the CPU 51.

By this, the instruction from the player is inputted to the CPU 51, and the CPU 51 performs processing corresponding to the instruction from the player, based on a game program or the like now executed. In detail, in cooperation with each of the other parts of the control system 50 and the graphics system 60, the CPU 51 generates an image including the operatable object and makes it displayed on a screen of the display unit. Then, by sequentially generating images with changed positions and posture of the operatable object (and changing the background of each image if necessary) to in accordance with instructions from the player inputted to the operating unit 20, and by displaying those images on the screen of the display unit, the CPU 51 generates a dynamic image as if the operatable object is operated according to the contents of player's operation inputted to the operating unit 20. Further, if necessary, the CPU 51 controls sound or music outputted by the acoustic system, in cooperation with the sound system 70.

Here, image data should be transferred at a high speed between the main memory 53, the GPU 62, the image decoder 64, the decoder 82, and the like, when, for example, a program is read or an image is displayed or generated. Accordingly, as to described above, this entertainment apparatus 1 can perform so-called DMA transfer, or, in other words, can directly transfer data between the main memory 53, the GPU 62, the image decoder 64, the decoder 82, and the like, being controlled by the peripheral control part 52 without intervention of the CPU 51. Thus, the load on the CPU 51 owing to data transfer can be reduced, and high-speed data transfer can be realized.

Further, when the setting data etc. of the game under execution should be stored, the CPU 51 transmits the communication controller 91 the data to be stored, and the communication controller 91 writes the data from the CPU 51 into a memory card 26 or portable electronic apparatus 100 mounted in the memory card inserting part 8A or 8B slot.

Here, the communication controller 91 has a built-in protection circuit for preventing electric damage. The memory card 26 or portable electronic apparatus 100 is separated from the bus BUS, and can be mounted or removed while the main body of the entertainment apparatus is in a powered state. Accordingly, when the storage capacity of the memory card 26 or the portable electronic apparatus 100 becomes deficient, a now memory card or the like can be mounted without interrupting power supply of the main body of the entertainment apparatus. Thus, by mounting a new memory card, necessary data can be written into the new memory card, without losing the game data that requires backup.

Here, a parallel I/O interface (PIO) 96 and a serial I/O interface (SIO) 97 are used as interfaces for connecting a memory card 26 or a portable electronic apparatus 100 with the entertainment apparatus 1.

Hereinabove, the hardware configuration of the entertainment apparatus 1 has been described.

Next, will be described a flight simulation game that is realized in the entertainment apparatus 1 having the above-described configuration, when the CPU 51 executes an application program read from an optical disk mounted in the disk mounting part 3.

Here, the flight simulation game is a game by which a player can experience piloting of an airplane virtually, by using the operating unit 20 connected to the entertainment apparatus 1 to operate an operatable object expressing the airplane, moving, for example, throughout a virtual 3D world that imitates the real world. The entertainment apparatus 1 generates a CG animation image obtained by a virtual camera photographing the operatable object moving throughout this virtual world, and displays the generated image on the screen of the display unit connected to the entertainment apparatus 1 itself.

Here, in the flight simulation game realized according to the present embodiment, weather phenomena such as cloud, rain and wind are reflected on an image of the CG animation image displayed on the screen of the display unit and operability of the operatable object by the operating unit 20, increasing the entertainingness. Further, with respect to the passage of time in the virtual 3D world of the flight simulation game realized by the present embodiment, time differences, date lines, etc. are ignored, and a unified time system is employed all over the virtual world. Here, the speed of time passing in the real world and the speed of time passing in the virtual world do not necessarily coincide with each other, and, for example, one day in the real world may correspond to one year in the virtual world.

First, data structure of an optical disk will be described.

Figure 5:
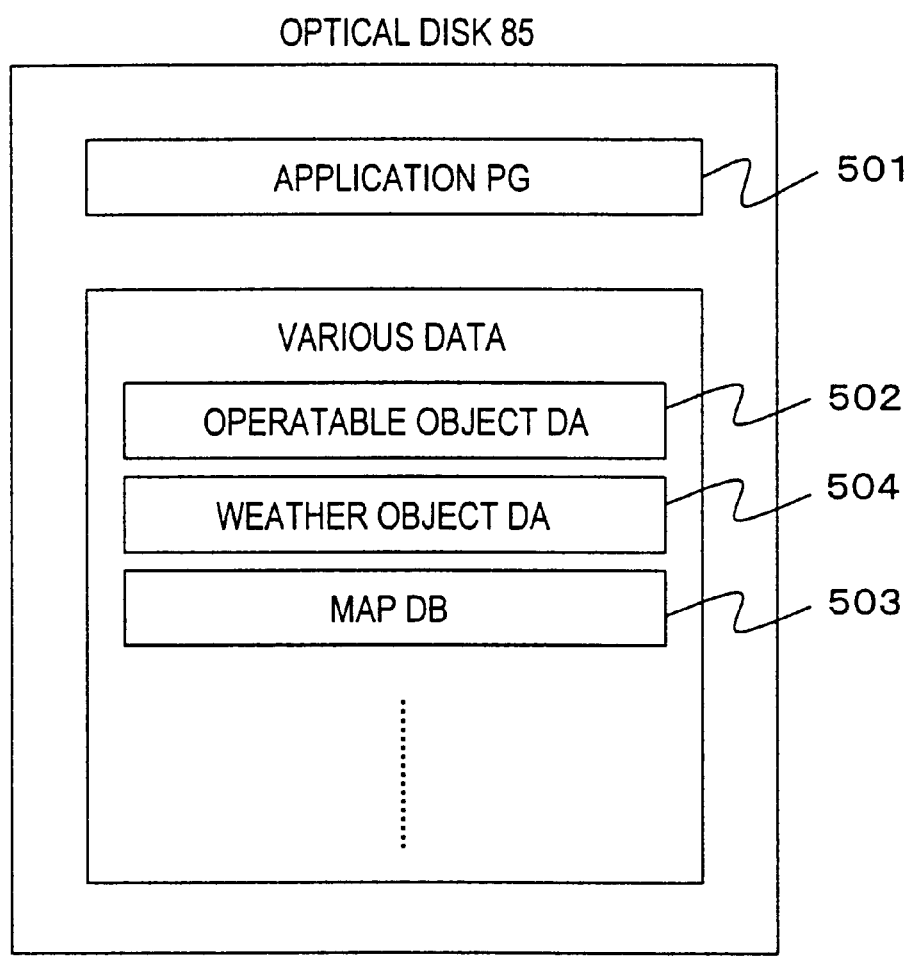
FIG. 5 is a diagram for explaining data structure of an optical disk 85 that is mounted to a disk mounting part 3 of the entertainment apparatus 1.

FIG. 5 is a diagram for explaining data structure of an optical disk 85 that is mounted to the disk mounting part 3.

As shown, the optical disk 85 stores various data including the application program (PG) 501 for realizing the flight simulation game, operatable object data (DA) 502, a map database (DB) 503, and weather object, data (DA) 504. The operatable object DA 502 includes various information required for specifying a 3D form, texture, etc. to of the operatable object (object expressing an airplane) that is operated by a player using the operating unit 20, in the flight simulation game. The map DB 503 stores information of various map components specifying geographical features of each area throughout the virtual world where the operatable object can move in the flight simulation game. And, the weather object DA 504 stores various information required for specifying a 3D form, texture, etc. of each of the weather objects expressing various weather phenomena such as cloud, rain, snow, lightening, etc. occurring in the virtual world.

Next, a software configuration for making up the flight simulation game realized on the entertainment apparatus 1 will be described.

Figure 6:
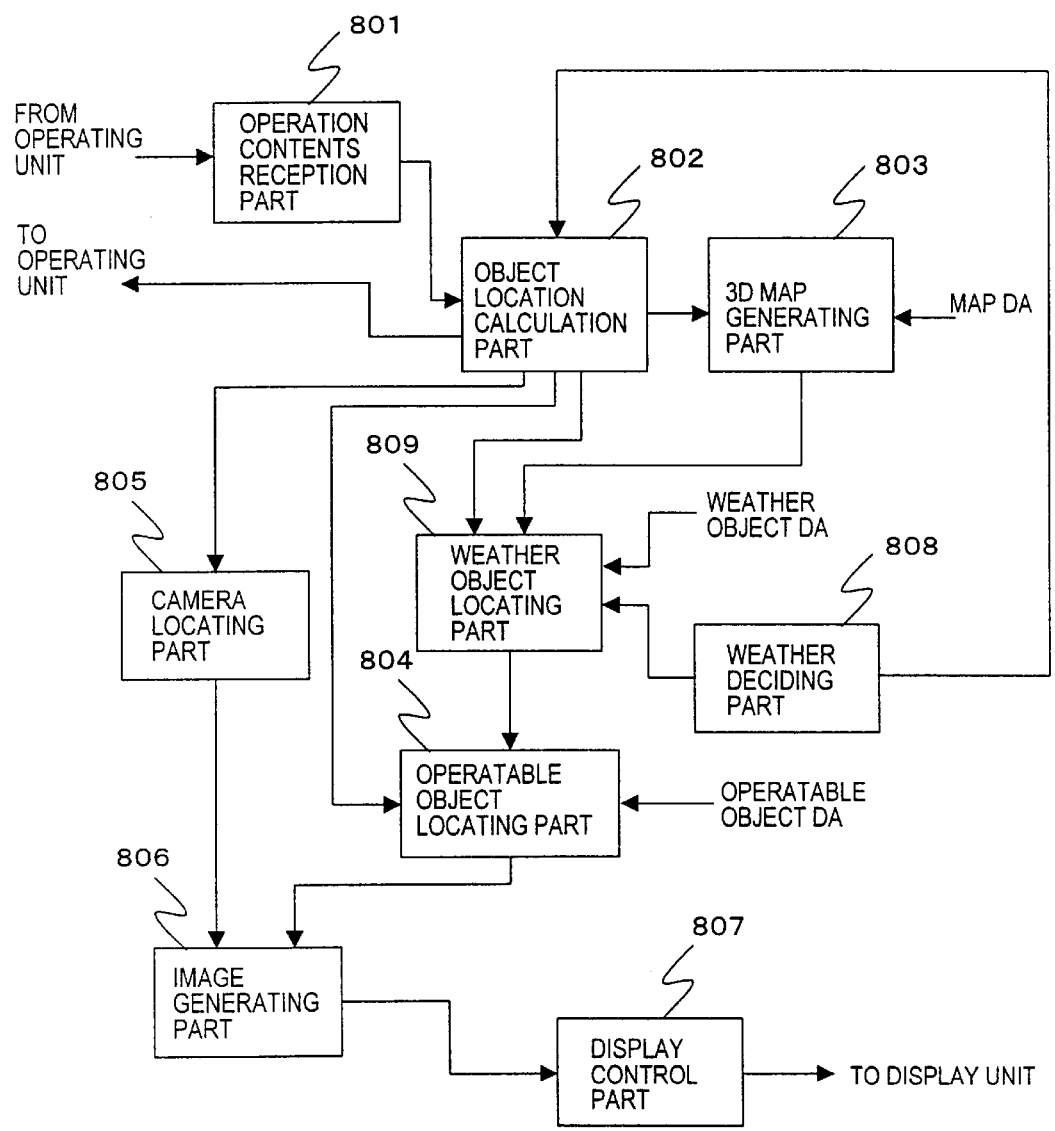
FIG. 6 is a diagram showing a software configuration for making up a flight simulation game realized on the entertainment apparatus 1 of FIG. 4.

FIG. 6 is a diagram showing a software configuration for making up the flight simulation game realized on the entertainment apparatus 1. Each component shown it the figure is realized as a process when the CPU 51 executes the application PG 501 read by the optical disk control part 80 from an optical disk 85 mounted in the disk control part 3, and loaded on the main memory 53.

In FIG. 6, a weather deciding part 808 generates a weather model expressing cloud, rain, snow, wind, or the like, when a predetermined condition is satisfied for each area of the whole virtual world constructed by all the map components stored in the map DB 503. Its details will be described later.

An operation contents reception part 801 decides a moving speed and moving direction of the operatable object moving in the virtual world, in accordance with an instruction inputted from the operating unit 20 by a player. This processing is performed at regular intervals.

Here, decision of the moving speed of the operatable object is performed by giving the same function as a throttle to one of the first and second operating parts 21, 22, the L button 23L, and the R button 23R, for example, of the operating unit 20. Namely, when a detection signal of the button to which the same function as a throttle is given is outputted by the operating unit 20, a judgment of throttle-on is made, and when the detection signal of the button in question is not outputted, a judgment of throttle-off is made. In the ease of trio judgment of throttle-on, the moving speed of the operatable object is decided by adding a predetermined rate of acceleration corresponding to the throttle-on and a speed obtained from the duration of the throttle-on from the last decision of the moving speed, to the last-decided moving speed of the operatable object. On the other hand, in the case of judgment of throttle-off, the moving speed of the operatable object is decided by subtracting a predetermined rate of deceleration corresponding to the throttle-off and a speed obtained from the duration of the throttle-off from the last decision of the moving speed, from the last-decided moving speed of the operatable object.

Further, the moving direction of the operatable object is decided by giving the same function as a control stick to the operating shafts 31*a* and 32*a* of the operating unit 20, for example. Namely, the lateral inclination of the airplane expressed by the operated object is decided in accordance with a value of X-coordinate of a signal that is outputted by the operating unit 20 owing to operation applied to the operating shafts 31*a* and 32*a* and corresponds to coordinate values in the X-Y coordinate system. And, rise, or fall of the nose of the airplane is decided in accordance with a value of Y-coordinate of the mentioned signal.

Further, the operation contents reception part 801 obtains a variation of relative moving direction with respect to the last-decided moving direction of the operatable object, based on the lateral inclination and rise or fall of the nose of the airplane expressed by the operated object, and the obtained variation is added to the last-decided moving direction of the operatable object. By this, the moving direction of the operatable object in question is decided.

Next, in FIG. 6, an object location calculation part 802 performs processing of calculating the location and posture of the operatable object in the virtual world, at regular intervals.

In detail, the present location of the operatable object is calculated from the last-calculated location of the operatable object and the latest moving speed of the operatable object decided by the operation contents reception part 801. Further, according to the latest moving direction of the operatable object decided by the operation contents reception part 801, the present posture of the operatable object is calculated.

Here, the object location calculation part 802 examines if the weather deciding part 808 generates a weather model expressing wind in the area including the newly calculated location of the operatable object. When the model is generated, effects of the wind are reflected on the location and posture of the operatable object by modifying the newly-calculated location and posture of the operatable object in accordance with the direction and speed of the wind indicated by that model.

Here, the operating unit 20 and the main body 2 of the entertainment apparatus 1 may perform two-way communication, and the operating unit 20 may be constructed such that, when a feedback signal from the main body 2 is detected the operating unit 20 vibrates or force required to for operating the analog operating parts 31 and 32 is changed. In that case, the object location calculation part 802 may output the feedback signal when the wind speed is more than or equal to a predetermined value, to reflect effects of the wind on the operability of the operatable object by an operator using the operating unit 20.

A 3D map generating part 803 reads map components that are to be arranged in the neighborhood of the location of the operatable object calculated by the object location calculation part 802, directly from the map DB 503 stored in the optical disk 85, and arranges those map components in the virtual world. Or, the 3D map generating part 803 reads the map components from the map DE 503 that is read from the optical disk 85 and temporally stored, for example, in the main memory 53. By this, geographical features to be spread around the location of the operatable object are generated.

Here, it is not necessary that the processing of generating geographical features by the 3D map generating part 803 is performed each time the location of the operatable object is calculated by the object location calculation part 802. For example, geographical features may be generated once in a plurality of times the object location calculation part 802 calculates the location of the operational object. In that case, taking into consideration the range in which the operatable object can move as a result of a plurality of calculations of the location of the operatable object by the object location calculation part 802 (that range can be estimated based on, for example, the preset maximum moving speed of the operatable object) it ie sufficient to read map components arranged in the neighborhood of that range from the map DB 503 and to arrange those map components in the virtual world.

A weather object locating part 809 examines if the weather deciding part 808 has generated a weather model expressing cloud, rain, snow, or the like with respect to the corresponding area in the virtual world, for which geographical features are spread by the 3D map generating part 803, (area in the neighborhood of the location of the operatable object, out of the whole virtual world). In the case where a weather model is generated, data of the weather object, such as 3D form and texture, of an weather object expressing a weather phenomenon corresponding to that weather model is read directly from the weather object DA 504 stored in the optical disk 85, or from the weather object DA 504 that is read from the optical disk 85 and temporally stored in the main memory 53, the frame buffer 63, or the like. In accordance with a size or intensity of the weather phenomena shown by that weather model (for example, a size and thickness in the case of cloud, and precipitation or snowfall in the case of rain or snow) to the weather object locating part 809 generates the weather object expressing the weather phenomena shown by that weather model based on its 3D form and texture read previously and locates in the virtual world. Its details will be described later.

An operatable object locating part 804 locates the operatable object whose 3D form etc. are specified by the operatable object DA 502 stored in the optical disk 85 at the newest location of the operatable object calculated by the object location calculation part 802, in the virtual world where geographical features are spread by the 3D map generating part 803. At this time, the operatable object is located such that the posture of the operatable object becomes the newest posture of the operatable object, calculated by the object location calculation part 802.

Here, in FIG. 4, the 3D map generating part 803, the operatable object locating part 804, and the weather object locating part 809 are realized, for example, by the CPU 51 utilizing the GTE 61.

Next, in FIG. 6, a camera locating part 805 performs processing for setting a located position (i.e., a viewpoint) and a direction (i.e., a direction of the sight line) of the virtual camera used for generating a two-dimensional image from the virtual 3D world in which the geographical features, weather objects, and operatable object are located by the 3D map generating part 803, the weather object locating part 809, and the operatable object locating part 804. This processing is performed whenever the object location calculation part 802 calculates the location and posture of the operatable object.

For example, a now located position of the camera is set as an arbitrary position on a line connecting the last-calculated located position of the camera and a position at a predetermined distance (or a distance corresponding to the moving speed of the operatable object) behind in the moving direction of the operatable object from the latest location of that object calculated by the object location calculation part 802.

Further, for example, a new direction of the camera is set as a direction in which the new located position of the camera sees a position at a predetermined distance (or a distance corresponding to the moving speed of the operatable object) forward in the moving direction of the operatable object from the latest location of that object calculated by the object location calculation part 802.

An image generating part 806 generates a two-dimensional image obtained by the virtual camera photographing the virtual 3D world in which the geographical features, weather object, and operatable object are located by the 3D map generating part 803, the weather object locating part 809, and the operatable object locating part 804. In detail, a two-dimensional image is generated by projecting (rendering) the operatable object, the weather object and the map components existing in the 3D world onto the virtual camera screen, setting the located position of the virtual camera as the viewpoint and the direction of the camera as the direction of the sight line.

A display control part 807 converts the two-dimensional image generated by the image generating part 806 into a video signal, and outputs the video signal to the display unit connected to the entertainment apparatus 1 in question.

Here in FIG. 4, the image generating part 806 and the display control part 807 are realized, for example, by the CPU 51 utilizing the GTE 61 and the GPU 62.

Next, the weather deciding part 808 and the weather object locating part 809 shown in FIG. 6 will be described further.

First, the weather deciding part 808 will be described.

Figure 7:
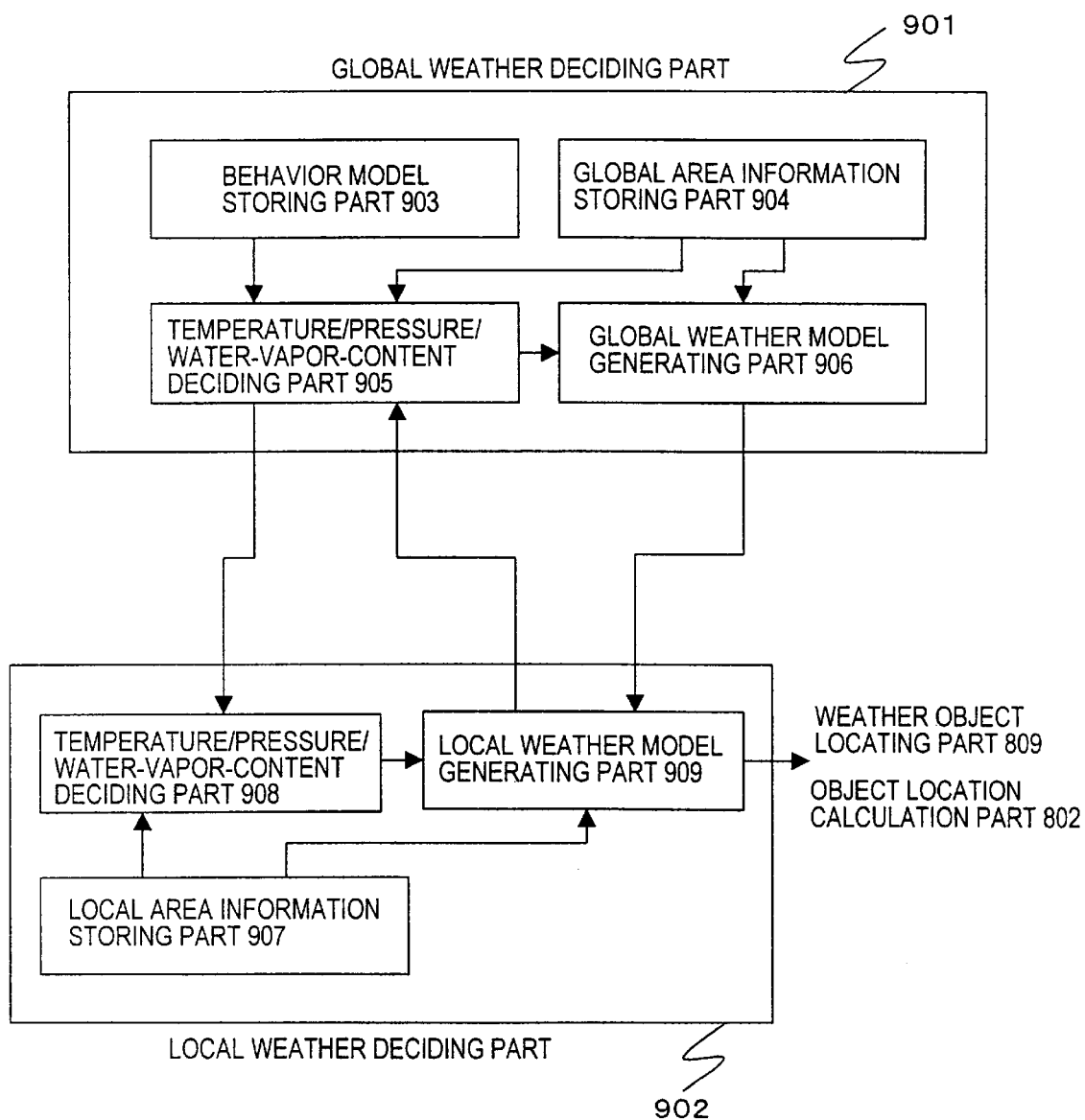
FIG. 7 is a diagram showing a software configuration of a weather deciding part 808 shown in FIG. 6.

FIG. 7 is a schematic block diagram of the weather deciding part 808 shown in FIG. 6.

As shown in the figure, the weather deciding part 808 comprises a global weather deciding part 901 and a local weather deciding part 902.

First, the global weather deciding part 901 will be described.

Figure 8:
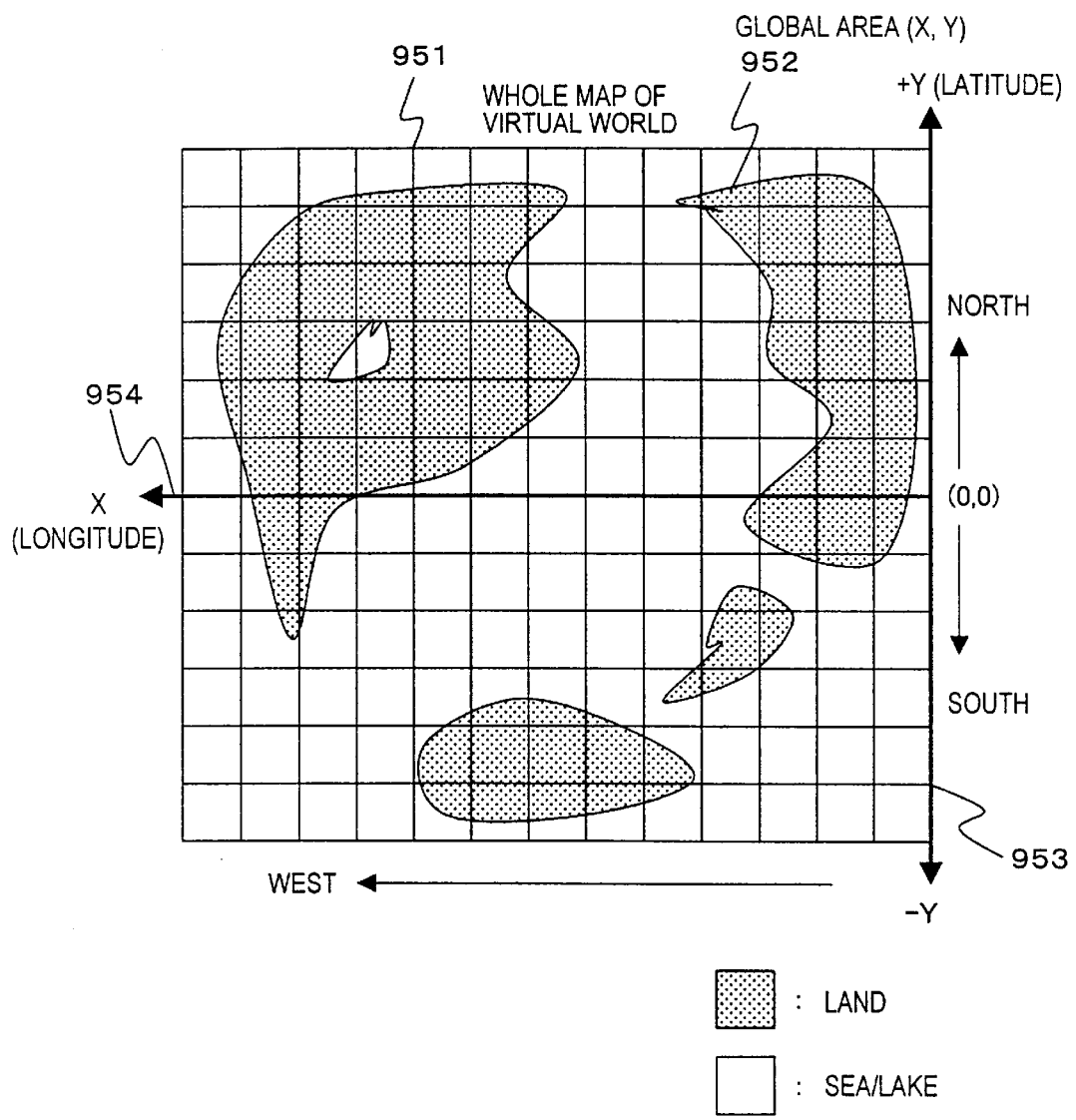
FIG. 8 is a view for explaining a concept of each global area 952 for which a global weather deciding part 901 shown in FIG. 7 decides weather.

As shown in FIG. 8, the global weather deciding part 901 decides weather in each global area (X, Y) 952 obtained by dividing a map expressing the whole of the virtual world, which is formed by all the map components stored in the map DB 503, into a plurality of areas. Here, the coordinate value X represents longitude. A line 953 of X=0 expresses the meridian, and, as X becomes larger, it goes westward. On the other hand, the coordinate value Y represents latitude, and a line 954 of Y=0 expresses the equator. In the case of Y>0, as its absolute value becomes larger, it goes northward. And in the case of Y<0, as its absolute value becomes larger, it goes southward.

As shown in FIG. 7, the global weather deciding part 901 comprises a behavior model storing part 903, a global area information storing part 904, a temperature/pressure/water-vapor-content deciding part 905, and a global weather model generating part 906.

The behavior model storing part 903 stores a behavior model. Here, the behavior model is obtained by modeling an event that generally appears and cyclically changes in the real world into an event that generally appears and cyclically changes in the whole virtual world constructed by all the map components stored in the map DB 503. In detail, to carry out the modeling, quantity of sunshine per a unit time at each month-day-time in each area of the real world (earth), which is dependent on one year fluctuation of quantity of sunshine owing to the revolution of the earth and one day fluctuation of quantity of sunshine owing to the rotation of the earth is applied to quantity of sunshine per a unit time at each month-day-time in each global area (X, Y) 952 shown in FIG. 8.

Here, will be described an example of the behavior model for defining quantity of sunshine per a unit time at each month-day-time at each global area (X, Y) 952, which is dependent on the one year fluctuation of quantity of sunshine owing to the revolution of the earth and the one day fluctuation of quantity of sunshine owing to the rotation of the earth.

(1) One Year Fluctuation of Quantity of Sunshine Owing to the Revolution of the Earth With respect to each area on the earth, one year fluctuation of quantity of sunshine behaves such that it becomes the maximum at a certain data and the minimum a half year later. Further, the day when the quantity of sunshine becomes the maximum is shifted a half year between the Northern Hemisphere and Southern Hemisphere. Further, nearer to the equator, larger becomes the absolute value of the quantity of sunshine. Thus, when one year in the virtual world is expressed in terms of days only, without using months (namely, one year is expressed by the 1st–365th day), quantity of sunshine $H_d$ of a day d in each global area 952 can be modeled by the following expression.

When $d_{MAX}-90$ days$<d<d_{MAX}+90$ days $H_d=H_{MAX}-a'\Delta d_{MAX}$, and when $d \leq d_{MAX}-90$ days, or $d_{MAX}-90$ days$\leq d$ $H_d = H_{MIN}+b'\Delta d_{MIN}$ Eq. 1 where $d_{MAX}$ and $d_{MIN}$ are days when the quantity of sunshine in the global area 952 in question becomes the maximum and minimum, respectively. Those days $d_{MAX}$ and $d_{MIN}$ are set to be shifted a half year (365/2=182 or 183 days) from each other. Further, $d_{MAX}$ for a global area 952 for which Y>0 and $d_{MAX}$ for a global area 952 for which Y<0 are set such that their $d_{MAX}$ are shifted a half year from each other.

Further, $\Delta d_{MAX}$ and $\Delta d_{MIN}$ indicate the number of days from the day d to the day$_{MAX}$ and the number of days from the day d to the day $d_{MIN}$, respectively.

$H_{MAX}$ and $H_{MIN}$ indicate quantity of sunshine (the maximum quantity of sunshine) of the day $d_{MAX}$ and quantity of sunshine (the minimum quantity of sunshine) of the day $d_{MIN}$, respectively, in the global area 952 in question. Those values are decided considering the longitude and latitude (X, Y) of the global area 952 in question.

Further, a and b are arbitrary coefficients. The coefficient a is set to become smaller as Y approaches 0. On the other hand, the coefficient b is set to become smaller as the absolute value or Y becomes larger. By this, in a global area in the neighborhood of the equator, hot days run for a long period, and in a global area 952 in the neighborhood of the northernmost or southernmost, cold days run for a long period.

(2) One Day Fluctuation of Quantity of Sunshine Owing to the Rotation of the Earth With respect to each area on the earth, one day fluctuation of quantity of sunshine behaves such that it becomes the maximum at a certain time. Further, the time when quantity of sunshine becomes the maximum becomes later as the area in question is located more westward. In the case where one day of the virtual world is expressed only by time without using a.m. and p.m. (namely, one day is expressed by 00:00–23:59), quantity of sunshine $H_t$ at the time t in each global area 952 is modeled by the following equation.

$H_t=H_a-c'\Delta t_{MAX}$ provided that it is replaced by $H_t=0$ if $H_t<0$. Eq. 2

In the above equation, $t_{MAX}$ is the time when quantity of sunshine becomes the maximum in the global area 952 in question. As for the easternmost global area 952 (X=0), $t_{MAX}$ is set as $t_{MAX}=00:00$. As the global area is located more westward, the time $t_{MAX}$ becomes larger. And, as for the westernmost global area 952, $t_{MAX}$ is set as $t_{MAX}=23:59$.

Further, $\Delta t_{MAX}$ is a period between the time t and the time $t_{MAX}$.

And, c is an arbitrary coefficient. This coefficient c is set as follows, for example. Namely, as for a global area 952 in the neighborhood of the northernmost or southernmost, the value of the coefficient c is changed in accordance with a day d such that $H_t$ becomes $H_t>0$ regardless or $\Delta t_{MAX}$ when the day d=the day $d_{MAX}$, and $H_t$ becomes $H_t<0$ regardless of $\Delta t_{MAX}$ when the day d=the day $d_{MIN}$. By this, in a global area 952 in the neighborhood of the northernmost or southernmost, the sun does not set (night with a midnight sun) in the day $d_{MAX}$, and does not rise in the day $d_{MIN}$. Further, closer to the equator from the northernmost or southernmost, the coefficient c is set such that a period of $\Delta t_{MAX}$ in which $H_t$ becomes $H_t>0$ in the day d=the day $d_{MAX}$ becomes shorter and a period of $\Delta t_{MAX}$ in which $H_t$ becomes $H_t<0$ in the day=the day $d_{MIN}$ becomes shorter. And, as for a global area 952 in the neighborhood of the equator, the coefficient c is set such that $H_t=0$ when $\Delta t_{MAX}=6$ hours regardless of the day d, making the sunshine duration of one day is 12 hours uniformly.

By substituting $H_4$ of the above Eq. 1 for $H_4$ of Eq. 2, fluctuation of quantity of sunshine per a unit time at each month-day-time in each global area 952 can be modeled.

Next, the respect to each global area 952, the global area information storing part 904 stores information on an area ratio between land and sea (including lakes) in the global area 952 in question, as global area information.

The temperature/pressure/water-vapor-content deciding part 905 decides temperature, pressure, and water vapor content for each global area 952. In detail, they are decided as follows.

(1) Decision of Temperature for Each Global Area 952

The temperature is calculated by obtaining a temperature variation from the last-decided temperature and adding the temperature variation to the last-decided temperature. This temperature variation is obtained based on the fluctuation of the quantity of sunshine in the global area 952 in question, the specific heat decided from the area ratio between land and sea of that global area, and effects of or on the adjacent global areas 952. Thus, the temperature $T_t$ at the time in each global area 952 is decided by the following equations, for example.

$T_t=T_{t'}+\Delta T+\Sigma T_{neighbor}$ $\Delta T=e'\Delta H$ Eq. 3

In the above equations, $T_{t'}$ is the last-decided temperature (temperature at the time t'). To decide temperature for the first time, an initial value that is different for each latitude value of a global area and is higher when the global area in question is closer to the equator (X=0) may be used as $T_{t'}$.

Further, $\Delta T$ is a temperature variation from the time t' to the time t, and is decided by the variation of quantity of sunshine in the global area 952 in question and the specific heat of that global area 952. Further, $\Delta H$ is a difference between the quantity of sunshine $H_t$ at the time t and the quantity of sunshine $H_{t'}$ at the time t' in the global area 952 in question, namely, the variation of quantity of sunshine $(H_t-H_{t'})$ in the period from the time t' to the time t, and this difference H is determined by the behavior model stored in the behavior model storing part 903. Further, e is a coefficient corresponding to the specific heat decided by the global area information (the area ratio between land and sea) of the global area in question, and that global information is stored in the global area information storing part 904. The coefficient e is set such that it becomes smaller as the ratio of the land becomes larger, and larger as the ratio of the sea becomes larger. Thus, $\Delta T$ becomes smaller as the ratio of the sea in the global area 952 in question becomes larger (difficult to heat, and difficult to cool), while $\Delta T$ becomes larger as the ratio of the land becomes larger (easy to heat, and easy to cool).

Further, $\Sigma^{T_{neighbor}}$ is a temperature variation caused by the effects of or on the eight global areas 952 adjacent to the global area 952 in question (in the map 951 shown in FIG. 8, five adjacent global areas 952 for the global area on an edge, or three adjacent global areas 952 for the global area at each of the four corners). Here, when the atmospheric pressure of the global area 952 in question is referred to as P, and the atmospheric pressure of one of the adjacent global areas 952 is referred to as $P_{neighbor}$, then, a temperature variation $T_{neighbor}$ caused by the mentioned one global area 952 can be decided by the following equations, for example.

(1) When $P-P_{neighbor}>0$, $T_{neighbor}=-g(T_{t'}-T_{neighbor,\ t'})(P-P_{neighbor})$, and (2) when $P-P_{neighbor}<0$, $T_{neighbor}=g(T_{neighbor,\ t'}-T_{t'})(P_{neighbor}-P)$      Eq. 4 where g is an arbitrary coefficient and $T_{neighbor,\ t'}$ is the last-calculated temperature (temperature at the time t') in the adjacent global area in question.

(2) Decision of pressure for each global area

Pressure is closely related to temperature (Boyle-Charle's law). Thus, pressure $P_t$ at the time t in each global area can be decided by the following equation, for example.

$$P_t = fT_t \quad \text{Eq. 5}$$

where f is an arbitrary coefficient.

(3) Decision of Water Vapor Content for Each Global Area

Water vapor content is calculated by obtaining a variation of water vapor content from the last-decided water vapor content and by adding that variation to the last-decided water vapor content. This variation from the last-decided water vapor content is obtained based on the quantity of sunshine at the present time in the global area 952 in question, the water content of the global area decided from the area ratio between the land and sea of the global area in question, the effects of or on the adjacent global areas 952, and the precipitation or snowfall according to a rain/snow model generated by the local weather deciding part 902 described below. Thus, the water vapor content $L_t$ at the time t in each global area 952 is decided by the following equations, for example.

$$L_t = L_{t'} + \Delta L + \Sigma L_{neighbor} - M_{local}$$

$$\Delta L = (T_t \cdot S)/j$$

Provided that if $L_t > L_{MAX}$, then $L_t$ is given by $$L_t L_{MAX} \quad \text{Eq. 6}$$

In the above equations, $L_{t'}$ is the last-decided water vapor content (water vapor content at the time t'). When water vapor content is decided for the first time, an initial value, which becomes larger when the ratio of sea of the global area is higher, for example, may be used as $L_{t'}$.

Further, $\Delta L$ is generated water vapor from the time t' to the time t in the global area 952 in question. $T_t$ is temperature at the time t in the global area 952 in question. S is a coefficient corresponding to the water content decided from the global area information (the area ratio between land and sea) of the global area in question stored in the global area information storing part 904. The coefficient S is set such that S becomes smaller as the ratio of land becomes larger, and becomes larger as the ratio of sea becomes larger. Further, j is an arbitrary coefficient. Thus, $\Delta L$ becomes larger as the ratio of sea of the global area 952 in question becomes larger (much) vapor is generated), and becomes smaller as the ratio of land becomes larger (only a little vapor is generated).

Further, $\Sigma L_{neighbor}$ is a variation of water vapor content caused by effects of or on the eight global areas 952 adjacent to the global area 952 in question (in the map 951 shown in FIG. 8, five adjacent global areas 952 for the global area on an edge, or three adjacent global areas 952 for the global area at each of the four corners). Here, when the pressure of the global area 952 in question is referred to as P and the pressure of one of the adjacent global areas 952 is referred to as $P_{neighbor}$, then, a variation of water vapor content $L_{neighbor}$ caused by the mentioned one global area 952 can be decided by the following equations, for example.

When $P-P_{neighbor}>0$, $L_{neighbor}=-k(L_{t'}-L_{neighbor,\ t'})(P-P_{neighbor})$, and when $P-P_{neighbor}<0$, $L_{neighbor}=k(L_{neighbor,\ t'}-L_{t'})(P_{neighbor}-P)$ Eq. 7 where k is an arbitrary coefficient and $L_{neighbor,\ t'}$ is the last-calculated water vapor content (water vapor content at the time t') in the adjacent global area in question.

Further, $M_{local}$ is disappearing water vapor content in the global area 952 in question, which is decided by the total amount of precipitation/snowfall according to a rain/snow model generated by the local weather deciding part 902 described below and located in each local area belonging to the global area 952 in question.

And, $L_{MAX}$ is saturated vapor of the global area in question, and that saturated vapor $L_{MAX}$ is decided by the temperature $T_t$ or pressure $P_t$ of the global area 952 in question.

Next, the global weather model generating part 906 generates a global weather model, i.e., a model that expresses a global weather phenomenon located in each global area 952. This global weather model is generated at given intervals based on temperature, pressure and water vapor content of that global area 952, which have been decided by the temperature/pressure/water-vapor-content deciding part 905. Here, the model that expresses a global weather phenomenon means a weather phenomenon that affects the weather of the whole virtual world. In detail, a high or low pressure area, a front, or an air current is generated as a global weather model. In the following, an example of generating each global weather model will be described.

(1) High/low pressure area model

Figure 9:
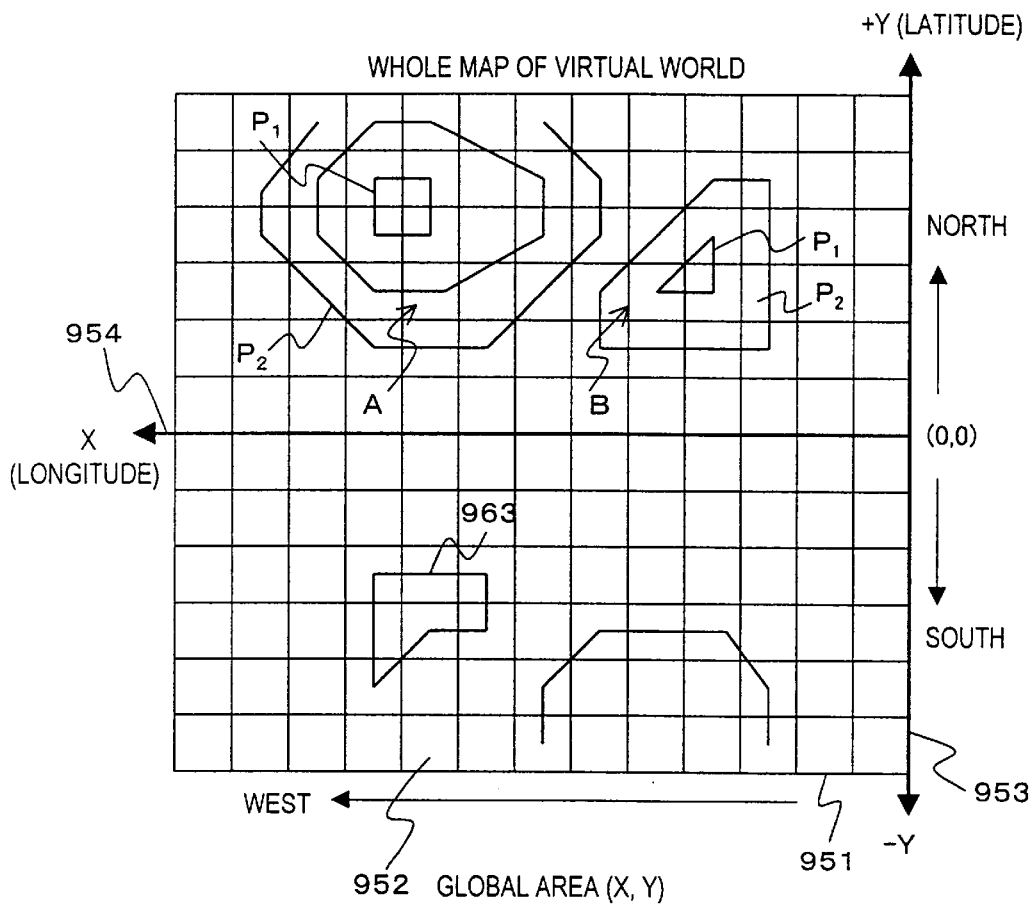
FIG. 9 is a view for explaining a high/low pressure area model generated as a global weather model by the global weather deciding part 901 shown in FIG. 7.

Pressure of each global area 952, which is decided by the temperature/pressure/water-vapor-content deciding part 905, is used to locate pressure lines in the map 951 expressing the whole virtual world. Here, as shown in FIG. 9, the pressure lines are located by setting virtual lines 963 each connecting global areas of about the same atmospheric pressure (with an error of less than 3%, for example) in the map 951, according to general rules that lines do not cross one another, lines do not branch, each line becomes a closed line (i.e., loop), and the like, as shown in FIG. 9, for example. Here, however, as for a pressure line located on an edge of the map 951, it does not matter if it is a closed line.

Next, after locating the pressure lines, parts in which two or more pressure lines are located repeatedly are detected. Thus, in the example shown in FIG. 9, the parts A and B are detected. Then, after detecting those parts in which two or more pressure lines are located repeatedly, then, with respect to each of such parts, are obtained an average pressure $P_1$ of a global area 952 through which the innermost pressure line passes, an average pressure $P_2$ of a global area 952 through which the outermost pressure line passes, and an average number 1 of global areas ranging from the innermost pressure line to the outermost pressure line. Here, the average number 1 of global areas ranging from the innermost pressure line to the outermost pressure line is at least 2 (in the case where the outermost pressure line is located passing through each global area 952 that is adjacent to a global area 952 through which the innermost pressure line passes, namely in the case of the part B shown in FIG. 9) since pressure lines do not cross one another.

Next, after obtaining the average pressure $P_1$ of the global area through which the innermost pressure line passes, the average pressure $P_2$ of the global area through which the outermost pressure line passes, and the average number 1 of global areas ranging from the innermost pressure line to the outermost pressure line, it is judged if the following expression is satisfied.

$(P_1-P_2)/1 > \alpha$      Eq. 8

$(P_1-P_2)/1 < -\alpha$      Eq. 9 where a is an arbitrary value set in advance as a condition for generating the high/low pressure area model.

When the above expression Eq. 8 is satisfied, the part in question is set as a high pressure area model. In detail, the size of the high pressure area model (i.e., range of high pressure's influence) is defined by the global areas 952 through which the outermost pressure line corresponding to the part in question passes and the global areas 952 existing inside those global areas. And, the center of the high pressure area model is defined by the global areas 952 through which the innermost pressure line passes and the global areas 952 existing inside those global areas. Further, the strength of the high pressure area model is expressed, for example, as "strong", "ordinary", "weak", or the like according to the absolute value of $(P_1-P_2)/1$. And, a size, center, and strength of a high pressure area model is held as information for specifying the high pressure area model.

On the other hand, when the above expression Eq. 9 is satisfied, the part in question is set as a low pressure area model. In detail, the size of the low pressure area model (i.e., range of low pressure's influence) is defined by the global areas 952 through which the outermost pressure line corresponding to the part in question passes and the global areas 952 existing inside those global areas. And, the center of the low pressure area model is defined by the global areas 952 through which the innermost pressure line passes and the global areas 952 existing inside those global areas. Further, the strength of the low pressure area model is expressed, for example, as "strong", "ordinary", "weak", or the like according to the absolute value of $(P_1-P_2)/1$. And, a size, center, and strength of a low pressure area model is held as information for specifying the low pressure area model.

(2) Front Model

Figure 10:
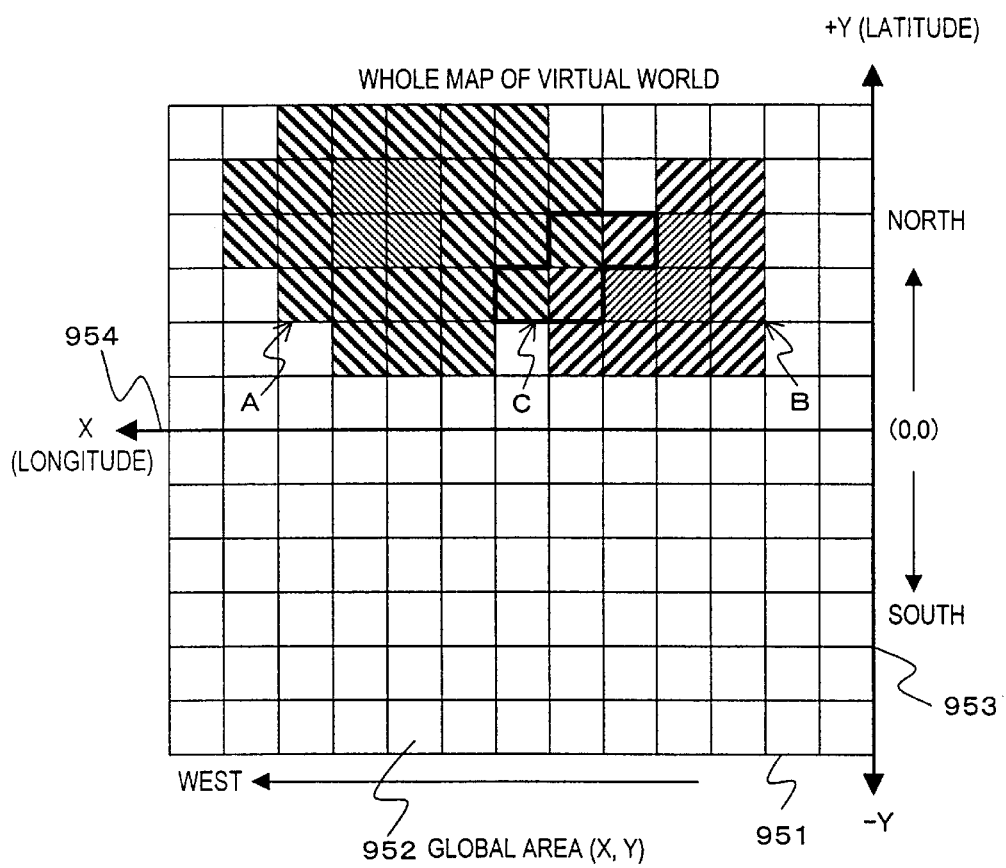
FIG. 10 is a view for explaining a front model generated as a global weather model by the global weather deciding part 901 shown in FIG. 7.

A front is generated on the boundary at which two air masses having different densities and temperatures (pressures) run against each other. Thus, as shown in FIG. 10, high/low pressure area models set according to the above (1) are located in the map 951. When two pressure area models are located and both abut each other, a front model is set in the global areas 952 that are adjacent to the boundary of those pressure area models, and information of those global areas is held as information for specifying the front model. The example shown in FIG. 10 illustrates a case in which the part A is set as a high pressure area model and the part B is set as a low pressure area model in FIG. 9. In this case, the part C enclosed by the heavy line is set as a front model.

(3) Air Current Model

Figure 11:
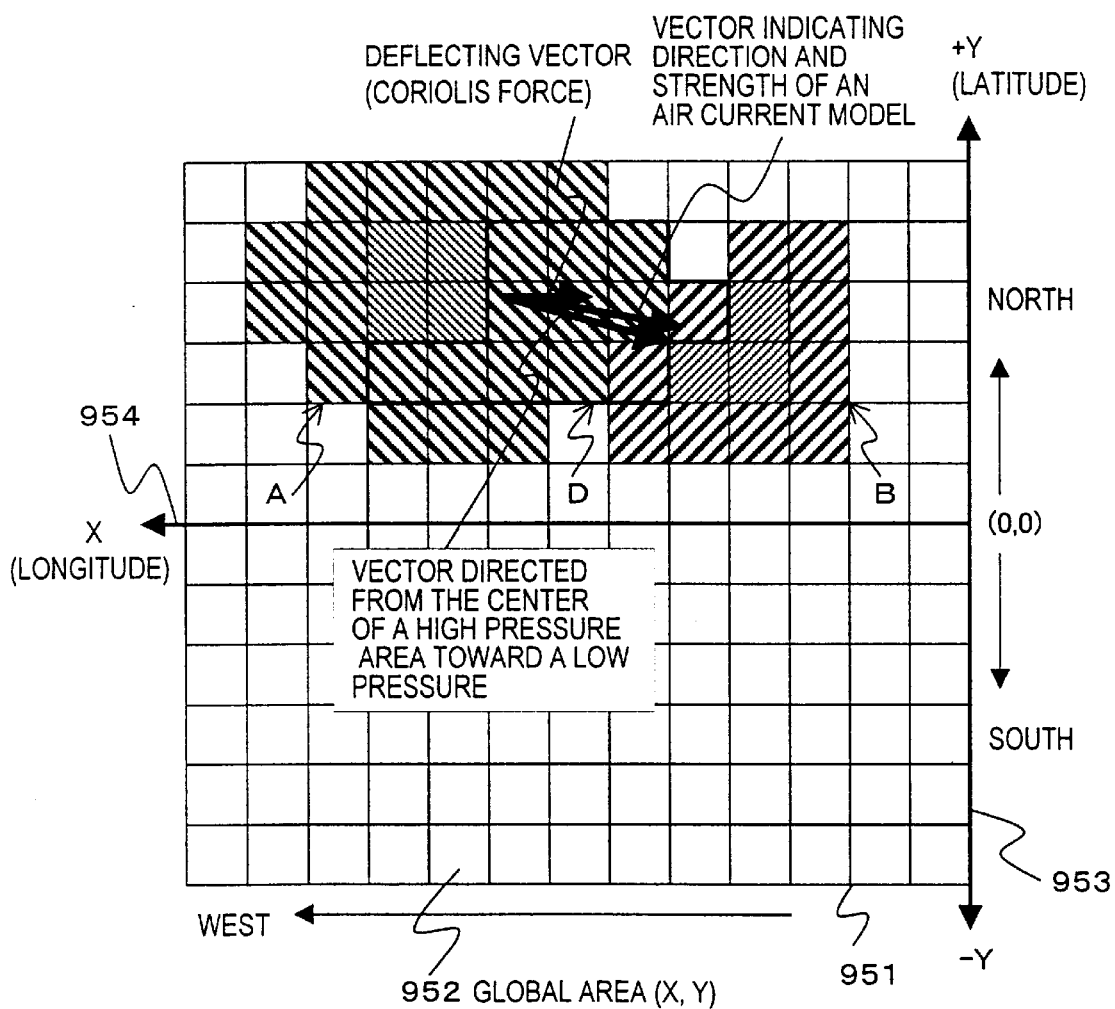
FIG. 11 is a view for explaining an air current model generated as a global weather model by the global weather deciding part 901 shown in FIG. 7.

An air current moves from a higher pressure area toward a lower pressure area. Thus, as shown in FIG. 11, the high/low pressure area models set according to the above (1) are located in the map 951. Then, when two pressure area models are located and one is an high pressure area model and the other is a low pressure area model, an air current model moving from the center of the high pressure area model toward the center of the low pressure area model is set. And, the side of the air current model is defined as global areas 952 placed between the center of the high pressure area model and the center of the low pressure area model (in FIG. 11, the part D enclosed by the heavy line). Further, the strength of the air current model is expressed, for example, as "strong", "ordinary", "weak", or the like according to the value obtained by dividing the difference of pressure between the center of the high pressure area model and the center of the low pressure area model by the distance from the center of the high pressure area model to the center of the low pressure area model (namely, the number of global areas from the global areas 952 set in the center of the high pressure area model to the global areas 952 set in the center of the low pressure area model). Further, the direction of the air current model is defined as a direction of a composite vector composed from a vector corresponding to the strength of the air current model decided as described above, which has a direction from the center of the high pressure area model to the center of the low pressure area model, and a vector expressing a preset deflecting force (Coriolis force).

Next, the local weather deciding part 902 will be described.

Figure 12:
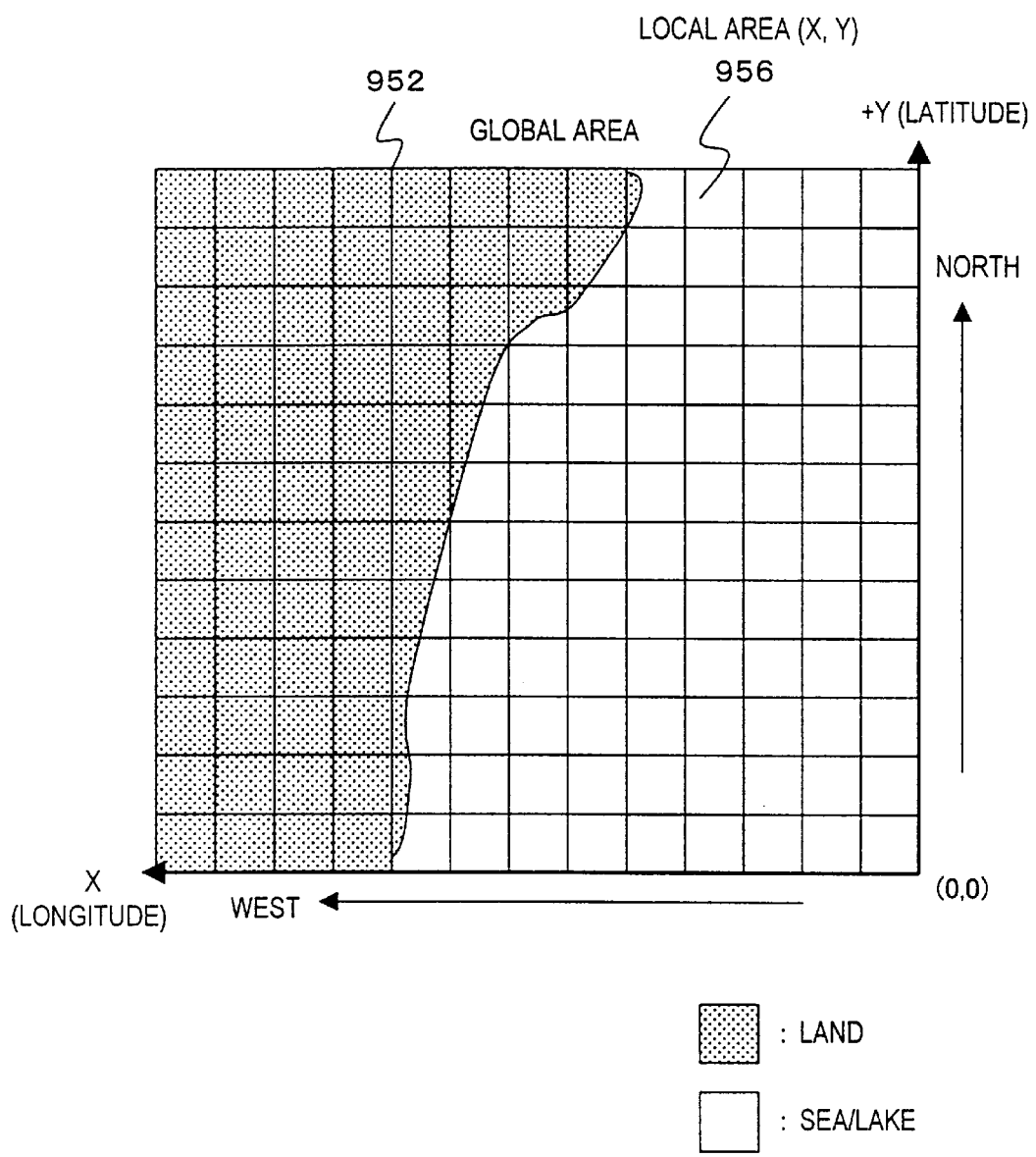
FIG. 12 is a view for explaining a concept of each local area 956 for which a local weather deciding part 902 shown in FIG. 7 decides weather.

As shown in FIG. 12, the local weather deciding part 902 decides weather in each local area (X, Y) 956 obtained by dividing each global area 952 into a plurality of areas. Here, the coordinate values X and Y represent longitude and latitude, respectively, with an origin being one of the four corners of the global area concerned.

As shown in FIG. 7, the local weather deciding part 902 comprises a local area information storing part 907, a temperature/pressure/water-vapor-content deciding part 908, and a local weather model generating part 909.

With respect to each local area 956 belonging to each global area 952, the local area information storing part 907 stores information on an area ratio between land an sea (including lakes) in the local area 956 in question, information on the height of the local area, and information on geographical features (mountainous area, flat area, cliff, or the like) of the local area when that local area is land, as local area information.

The temperature/pressure/water-vapor-content deciding part 908 decides temperature, pressure, and water vapor content for each local area 956 of each global area 952, at given intervals. In detail, they are decided as follows.

(1) Decision of Temperature for Each Local Area 956

The temperature is calculated by obtaining a temperature variation from the last-decided temperature, and adding this variation to the last-decided temperature. The temperature variation is obtained based on the temperature given to the global area 952 to which the local area in question belongs, the specific heat decided from the area ratio between land and sea of that local area, the height of the local area, and effects of or on the adjacent local areas 956. Thus, the temperature $T'_t$ at the time t in each local area 952 can be decided by the following equations, for example.

$T'_t = T'_{t'} + \Delta T' + \Sigma T'_{neighbor}$ $\Delta T' = m((T_t - n(|T_t|)) - T'_{t'})$      Eq. 10 where $T'_{t'}$ is the last-decided temperature (temperature at the time t'). Further, to decide temperature for the first time, the temperature $T_t$ given to the global area 952 to which the local area 956 in question belongs may be used as an initial value $T'_{t'}$.

Further, $\Delta T'$ is a temperature variation from the time t' to the time t, which is affected by the temperature $T_t$ of the global area 952 to which the local area 956 in question belongs. Further, m is a coefficient corresponding to the specific heat decided by the local area information (the area ratio between land and sea) of the local area in question, and that local area information is stored in the local area information storing part 907. The coefficient m is set such that it becomes larger as the ratio of the land becomes larger, and smaller as the ratio of the sea becomes larger. Thus, ΔT' becomes less affected by the temperature $T_t$ of the global area 952 to which the local area 956 in question belongs, as the ratio of the sea in the local area 956 becomes larger, and more affected by the temperature $T_t$ as the ratio of the land becomes larger. Further, n is a coefficient corresponding to the local area information (height) of the local area in question stored in the local area information storing part 907. The coefficient n is set such that it becomes larger as the height becomes larger, and smaller as the height becomes smaller. By this, it is possible to set the temperature of the local area 956 such that the temperature becomes lower in relation to the temperature $T_t$ of the global area 952 to which the local area 956 belongs, as the height of the local area 956 becomes larger.

Further, $\Sigma^{T'_{neighbor}}$ is a temperature variation caused by the effects of or on the eight local areas 956 adjacent to the local area 956 in question (in the global area 952 shown in FIG. 12, five adjacent local areas 956 for the local area on an edge, or three adjacent local areas 956 for the local area at each of the four corners). Here, when the atmospheric pressure of the local area 956 in question is referred to as P', and the atmospheric pressure of one of the adjacent local areas 956 is referred to as $P'_{neighbor}$, then, a temperature variation $T'_{neighbor}$ caused by the mentioned one local area 956 can be decided by the following equations, for example.

When $P'-P'_{neighbor} > 0$, $T'_{neighbor} = -p(T'_t - T'_{neighbor,\ t'}) (P' - P'_{neighbor})$, and when $P'-P'_{neighbor} < 0$, $T'_{neighbor} = p(T'_{neighbor,\ t'} - T'_t)$
$(P'_{neighbor} - P')$      Eq. 11 where p is an arbitrary coefficient and $T'_{neighbor,\ t'}$ is the last-calculated temperature (temperature at the time t') in the adjacent local area in question.

(2) Decision of pressure for each local area

Pressure is closely related to temperature (Boyle-Charle's law). Thus, pressure $P'_t$ at the time t in each local area can be decided by the following equation, for example.

$P'_t = fT'_t$      Eq. 12 where f is an arbitrary coefficient.

(3) Decision of water vapor content for each local

Water vapor content is calculated by obtaining a variation of water vapor content from the last-decided water vapor content and by adding that variation to the last-decided water vapor content. This variation from the last-decided water vapor content is obtained based on the water vapor content given to the global area 952 to which the local area 956 in question belongs to, the water content of the local area 956 decided from the area ratio between the land and sea of the local area 956 in question, and effects of or on the adjacent local areas 956. Thus, the water vapor content $L'_t$ at the time t in each local area 956 is decided by the following equations, for example.

$L'_t = L'_{t'} + \Delta L' + \Sigma L'_{neighbor}$ $\Delta L' = qL_t - L'_{t'}$ Provided that if $L'_t > L'_{MAX}$, then $L'_t$ is given by $L'_t = L'_{MAX}$      Eq. 13

In the above equations, $L'_{t'}$ is the last-decided water vapor content (water vapor content at the time t'). When water vapor content is decided for the first time, the water vapor content $L_t$ given to the global area 952 to which the local area 956 in question belongs may be used at $L'_{t'}$.

Further, ΔL' is a variation between the time t' and the time t in the local area 956 in question, and that variation is affected by the water vapor content $L_t$ of the global area 952 to which the local area 956 belongs. Further, q is a coefficient corresponding to a ratio of the water content decided from the local area information (the area ratio between land and sea) of the local area 956 in question to the water content decided from the global area information (the area ratio between land and sea) of the global area 952 to which the local area in question belongs. The local area information is stored in the local area information storing part 907 and the global area information is stored in the global area information storing part 904. The coefficient q is set such that it becomes larger as the ratio of the water content of the local area 956 to the water content of the global area 952 is larger.

Further, $L'_{neighbor}$ is a variation of water vapor content caused by effects of or on the eight local areas 956 adjacent to the local area 956 in question (in the global area 956 shown in FIG. 12, five adjacent local areas 956 for the local area on an edge, or three adjacent local areas 956 for the local area at each of the four corners). Here, when the pressure of the local area 956 in question is referred to as P' and the pressure of one of the adjacent local areas 956 is referred to as $P'_{neighbor}$, then, a variation of water vapor content $L'_{neighbor}$ caused by the mentioned one local area 956 can be decided by the following equations, for example.

When $P'-P'_{neighbor} > 0$, $L'_{neighbor} = -r(L'_t - L'_{neighbor,\ t'}) (P'-P'_{neighbor})$, and when $P'-P'_{neighbor} < 0$, $L'_{neighbor} = r(L'_{neighbor,\ t'} - L'_t)$
$(P'_{neighbor} - P')$      Eq. 14 where r is an arbitrary coefficient and $L'_{neighbor,\ t'}$ is the last-calculated water vapor content (water vapor content at the time t') in the adjacent local area in question.

Further, $L'_{MAX}$ is saturated vapor of the local area in question, and that saturated vapor $L'_{MAX}$ is decided by the temperature $T'_t$ or pressure $P'_t$ of the local area 956 in question.

Next, for each global area 952, the local weather model generating part 909 generates a local weather model, i.e., a model that expresses a local weather phenomenon located in each local area 956 belonging to that global area 952. This local weather model is generated at given intervals, based on temperature, pressure, and water vapor content of the local area 956 in question. Here, the model that expresses a local weather phenomenon means a weather phenomenon that affects local weather. In detail, cloud, rain, snow, wind, lightning, or whirlwind is generated as a local weather model. In the following, an example of generating each local weather model will be described.

(1) Cloud Model

As for each local area 956 of each global area 952, a local weather model that expresses cloud is set in the local area in question, based on the humidity of that local area 956, area information given to that local area 956 in advance, and global weather models generated by the global weather generating part 906. The humidity of the local area 956 is decided from the temperature/pressure and water vapor content of that local area 956, which, in turn, are decided by the temperature/pressure/water-vapor-content deciding part 908. In detail, the local weather model that expresses cloud is set as follows, for example.

Namely, first, for each local area 956, the humidity h is calculated using the temperature $T'_t$/pressure $P'_t$ and water vapor content $L'_t$ of the local area 956 in question decided by the temperature/pressure/water-vapor-content deciding part 908.

Then, local areas 956 whose humidity h is an arbitrary predetermined value $\beta_1$ (for example, 50%) or more are detected, to set cloud models in the detected local areas 956. And, a local area 956 in which a cloud model is set and the strength (thickness) of the cloud decided according to the humidity h of that local area 956 is held as information for specifying that cloud model.

Next, out of local areas 956 whose humidity h is less than the predetermined value $\beta_1$, local areas whose humidity h is an arbitrary predetermined value $\beta_2$ (provided that $\beta_2<\beta_1$, for example, 30%) or more are detected. Then, the local area information of each detected local area 956 is examined using the local area information storing part 907, to further detect local areas 956 whose geographical features indicate a mountainous area. In the real world, in a mountainous area, the weather is apt to change and cloud is easily generated. Thus, among the local areas 956 whose humidity h is more than or equal to the predetermined value $\beta_2$, a cloud model is set for each local area 956 whose geographical features indicate a mountainous area. And, the local area 956 in question and the strength of the cloud decided according to the humidity h of that local area 956 are held as information for specifying the cloud model.

Then, as for each local area 956 whose humidity h is more than or equal to $\beta_2$ and whose geographical features do not indicate a mountainous area, it is examined if a front model set by the global weather generating part 906 is located in the global area 952 to which the local area in question belongs. In the real world, cloud is apt to grow at a front. Thus, among the local areas 956 having the humidity h equal to the predetermined value $\beta_2$ or more, a cloud model is set for each local area 956 belonging to a global area 952 where a low pressure area model is located. And, the local area 956 in question and the strength of the cloud decided according to the humidity h of that local area 956 are held as information for specifying the cloud model.

(2) Rain/Snow Model

Out of the local areas 956 for which cloud models are set according to the above (1), local areas 956 whose humidity h is more than or equal to an arbitrary predetermined value $\beta_3$ ($\beta_1<\beta_3$, for example 60%) are detected. Then, as for each detected local area 956, the temperature $T'_t$ of the local area 956 in question decided by the temperature/pressure/water-vapor-content deciding part 908 is examined. When the temperature $T'_t$ is more than or equal to an arbitrary predetermined value $\gamma$ (for example zero), a rain model is set for the local area 956 in question. And, that local area 956 and the strength of the rain (precipitation per a unit time) deciding according to the humidity h of that local area 956 are held as information for specifying the rain model. On the other hand, when the temperature $T'_t$ is smaller than the predetermined value $\gamma$, a snow model is set for the local are 956 in question. And, that local area 956 and the strength of the snow (snowfall per a unit time) decided according to the humidity h of that local area 956 are held as information for specifying the snow model.

Next, as for each local area 956 for which rain/snow model is not set among the local areas 956 for which a cloud model is set according to the above (1), it is examined if a front model, which is set by the global weather generating part 906, is located in a global area 952 to which the local area 956 in question belongs. In the real world, rain or snow is apt to occur at a front. Thus, when a front model is located in that global area 952, the temperature $T'_t$ of the local area 956 in question is examined. When the $T'_t$ is more than or equal to the predetermined value $\gamma$, a rain model is set for the local area 956 in question. And, that local area 956 and the strength of the rain (precipitation per a unit time) decided according to the humidity h of that local area 956 are held as information for specifying the rain model. On the other hand, when the $T'_t$ is less than the predetermined value $\gamma$, a snow model is set for the local area 956 in question. And, that local area 956 and the strength of the snow (snowfall per a unit time) decided according to the humidity h of that local area 956 are held as information for specifying the snow model.

(3) Wind model

As for each local area 956 of each global area 952, a local weather model that expresses wind is set for the local area in question based on pressures of the local area 956 in question and its adjacent local area, the area information given to that local area 956 in advance, and global weather models generated by the global weather generating part 906. The mentioned pressures are decided by the temperature/pressure/water-vapor-content deciding part 908. In detail, the local weather model that expresses wind is set as follows, for example.

Namely, as for a certain local area 956 (referred to as a marked local area 956), an adjacent local area 956 whose difference of atmospheric pressure from the marked local area 956 becomes the maximum is detected. Then, a first vector is set as follows. Namely, when the pressure $P_t$ of the marked local area 956 is larger than the pressure $P_{neighbor, t}$ of the detected adjacent local area, direction of the first vector is decided as the direction from the marked local area 956 toward the detected adjacent local area 956, and magnitude of the first vector is decided according to the difference of pressure between the marked local area 956 and the detected adjacent local area 956.

Next, when an air current model generated by the global weather model generating part 906 is set for the global area to which the marked local area 956 belongs, a second vector is set according to the strength and direction of the air current shown by the mentioned air current model.

Then, when the second vector is set, the direction and strength of a composite vector of the first and second vectors are decided as direction and strength of a wind model set for the marked local area. When the second vector is not set, the direction and strength of the first vector are decided as the direction and strength of the wind model set for the marked local area.

Next, after the direction and strength are set, the local area information of the marked local area is read from the local area information storing part 907, to examine if the information show that the marked local area is a mountainous area or cliff. In the real world, frequently, a gust blows or a wind direction changes suddenly in a mountainous area or at a cliff. Thus, when the local area information indicates a mountainous area or cliff, a wind model is set as turbulence.

The above processing is performed taking each of all the local areas 956 as a marked local area 956, to set a wind model for each local area 956.

(4) Lightning model

As for a local area 956 for which a cloud model is set according to the above (1), the temperature $T_t$ of that local area 956 decided by the temperature/pressure/water-vapor-content deciding part 908 is examined. In the real world, when temperature is higher, an ascending current is apt to occur, and a probability of generation of a cumulonimbus that causes lightning becomes higher. Thus, when the temperature $T_t$ is more than or equal to an arbitrary predetermined value σ (for example, 30° C.), a lightning model is set for the local area 956 in question with a predetermined probability (for example, 30%).

(5) Whirlwind model

Whirlwind is similar to lightning in that, in the real world, when temperature is higher, an ascending current is apt to occur, and a probability of generation of a cumulonimbus that causes whirlwind becomes higher. As for a local area 956 for which a cloud model is set according to the above (1), the temperature $T_t$ of the local area 956, which is decided by the temperature/pressure/water-vapor-content deciding part 908, is examined. And, when the temperature $T_t$ is more than or equal to an arbitrary predetermined value δ (for example, 30° C.), a whirlwind model is set for the local area 956 in question with a predetermined probability (for example, 3%).

Hereinabove, the weather deciding part 808 has been described.

Next, the weather object locating part 809 will be described.

Figure 13:
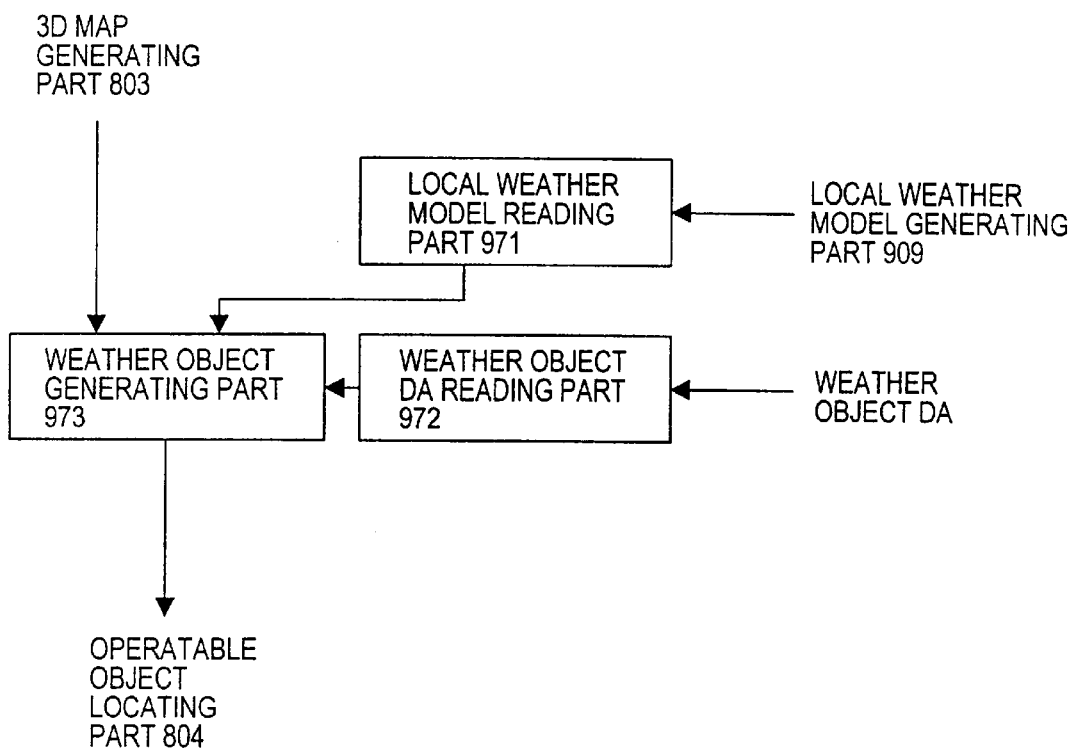
FIG. 13 is a diagram showing a software configuration of a weather object locating part 809 of FIG. 6.

FIG. 13 is a schematic block diagram showing the weather object locating part 809 showing in FIG. 6.

As shown in the figure, the weather object locating part 809 comprises a local weather model reading part 971, a weather object data reading part 972, and a weather object generating part 973.

The local weather model reading part 971 obtains information for specifying a local weather model, which is set for a local area 956 and designated by the weather object generating part 973, from the local weather model generating part 909, and delivers the obtained information to the weather object generating part 973.

The weather object data reading part 972 reads various information for specifying a 3D form and texture of the local weather model designated by the weather object generating part 973, directly from the weather object DA 504 stored in the optical disk 85, or from the weather object DA 504 that is read from the optical disk 85 and stored temporally in the main memory 53, the frame buffer 63, or the like, and delivers the information to the weather object generating part 973.

The weather object generating part 973 specifies the local area 956 that includes the area of the 3D map generated by the 3D map generating part 803 (i.e., area in the neighborhood of the location of the operatable object calculated by the object location calculation part 802). Then, by designating the specified local area, the weather object generating part 973 requests the local weather model reading part 971 to obtain the information for specifying the local weather models set for the local area 956 in question. When the information for specifying the local weather models is obtained from the local weather model reading part 971, then, with respect to each of the local weather models for which the information has been obtained, the weather object generating part 973 requests the weather object data reading part 972 to obtain various information for specifying 3D forms and textures of the local weather model in question. However, in the case where a local weather model for which the information has been obtained is a wind model, the request to the weather object data reading part 972 is not made.

Here, it is not necessary that the processing for obtaining the information for specifying the local weather models and the object data of those models is performed each time the location of the operatable object is calculated by the object location calculation part 802. For example, the mentioned processing may be performed once in a plurality of times the object location calculation part 902 calculates the location of the operatable object. Or, it may be performed whenever the 3D map generating part 803 performs processing for generating geographical features (namely, whenever the 3D map is updated). Or, it may be performed at predetermined time intervals.

Next, when, as described above, the weather object generating part 973 obtains information for specifying each local weather model and its object data set for the local area 956 including the area of the 3D map generated by the 3D map generating part 803, then, the weather object generating part 973 generates a weather object that expresses a weather phenomenon indicated by each local weather model, in accordance with the size and/or strength of that weather phenomenon indicated by the information specifying that local weather model, and locates the generated weather object in the 3D map generated by the 3D generating part 803. This processing is performed each time the object location calculation part 802 calculates the location of the operatable object. In detail, this processing is performed as follows.

(1) Cloud object

Figure 14A:
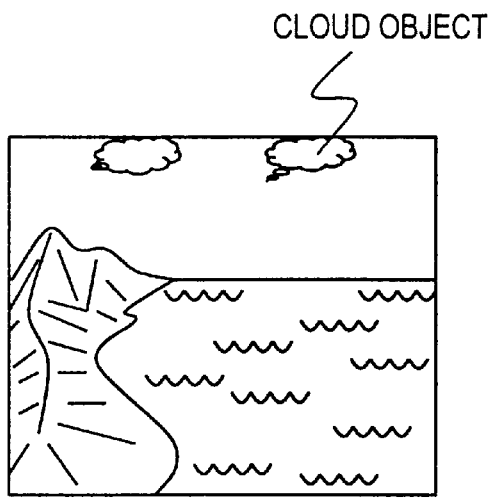
FIGS. 14A and 14B are views for explaining a cloud object located on a screen by the weather object locating part 809 shown in FIG. 13.
Figure 14B:
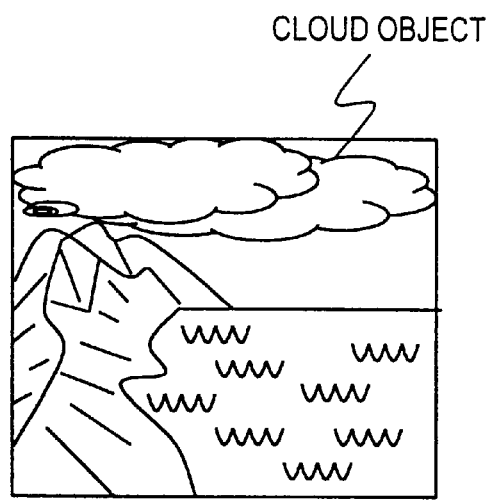

An object that expresses cloud is generated based on the 3D form and texture of the cloud object, and located in the sky of the 3D map. At that time, locating density and located position (height) of the cloud object are changed in accordance with the size of the cloud indicated by the information for specifying the cloud model. For example, when the size shown by the cloud object is small, the locating density of the cloud object 981 is made sparse and its located position (height) is made high, as shown in FIG. 14A. On the other hand, when the size is large, the locating density of the cloud object 981 is made dense, and the located position (height) is made low, as shown in FIG. 14B.

Here, the cloud object is generated in accordance with the information specifying the present cloud model and located in the 3D map, until the weather object generating part 973 newly reads information for specifying the local weather models (until the local weather models are updated). In the meantime, it lacks reality if the cloud object is located in the same location all the time. Thus, until the local weather models are updated, the located position of the cloud object is updated using the information specifying the wind model that is set for the local area 956 including the area of the 3D map generated by the 3D map generating part 803, in order to express movement of the cloud object. Namely, in accordance with the direction and strength of the wind model, the moving direction and speed of the cloud object are decided. And, until the local weather model is updated, the located position of the cloud object is calculated based on thus-deciding moving direction and speed, to update the located position of the cloud object in question.

(2) Rain/snow object

Figure 15:
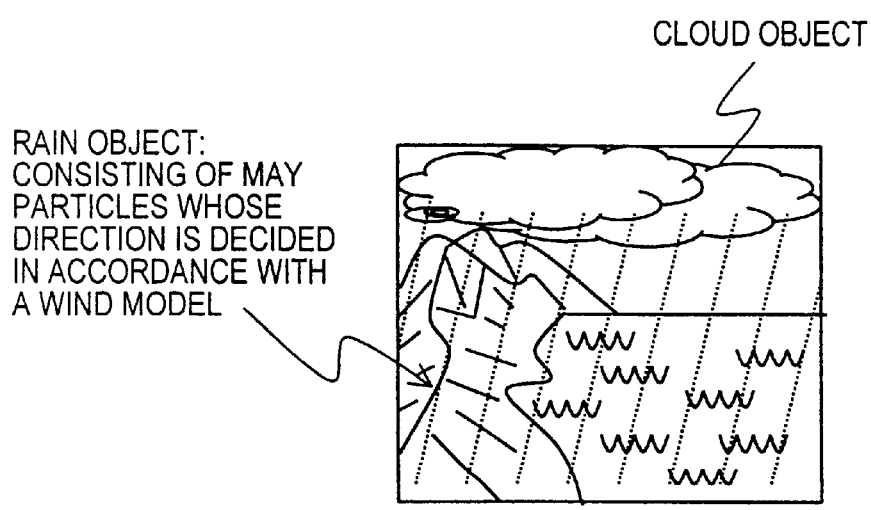
FIG. 15 is a view for explaining a rain object located on a screen by the weather object locating part 809 shown in FIG. 13.

An object that expresses rain/snow is generated based on a particle and texture of a rain/snow object, and located in the 3D map. At that time, locating density of particles of the rain/snow object is decided in accordance with the precipitation/snowfall indicated in the information specifying the rain/snow model. And, the located position of each particle is calculated and update such that particles of the rain/snow object move at a predetermined speed, each time the object location calculation part 802 calculates the location of the operatable object. By this, a state of a falling rain/snow is expressed. Further, at this time, the direction of the falling rain/snow is decided using the information specifying the wind model that is set for the local area 956 including the area of the 3D map generated by the 3D map generating part 803, and the located position of each particle is calculated and updated such that the particles of the rain/snow object move in accordance with thus-decided direction. By this, a state of falling rain/snow under the influence of the wind is expressed, as shown in FIG. 15. Here, when the wind model is set as turbulence, it is better that the direction of falling rain/snow is decided at random (to become a different direction each time the located positions are updated).

(3) Lightning object

Figure 16:
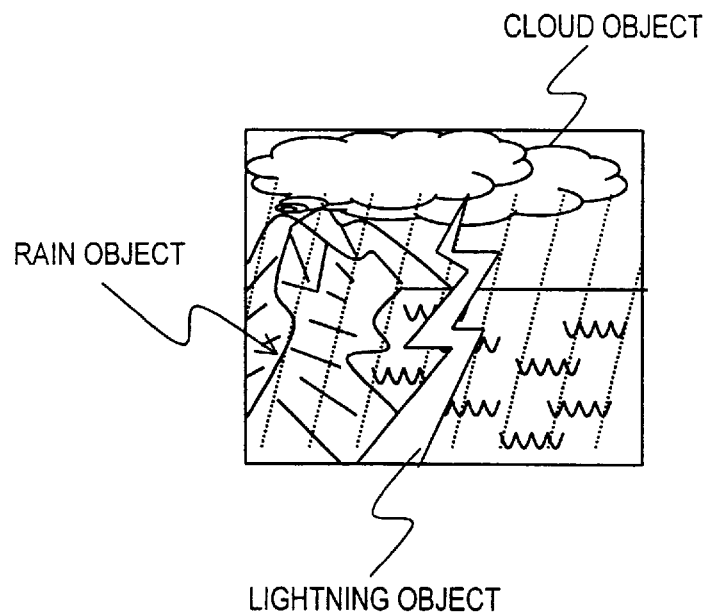
FIG. 16 is a view for explaining a lightning object located on a screen by the weather object locating part 809 shown in FIG. 13.

An object that expresses lightning is generated based on the texture of the lightning object, according to predetermined rules (for example, lightning occurs linking the sky and the ground) as shown in FIG. 16, and located in an arbitrary location in the 3D map with an arbitrary probability. This processing is performed each time the object location calculation part 802 calculates the location of the operatable object, until the weather object generating part 973 newly reads information specifying the local weather models (until the local weather models are updated).

(4) Whirlwind object

Figure 17:
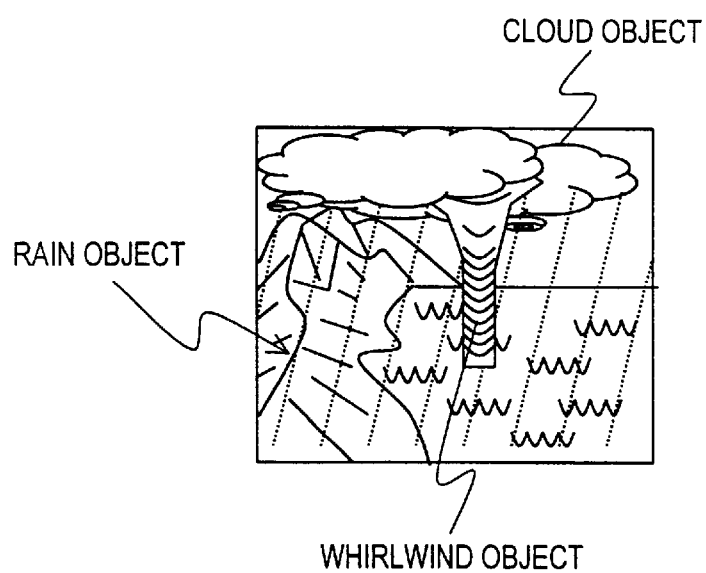
FIG. 17 is a view for explaining a whirlwind object located on a screen by the weather object locating part 809 shown in FIG. 13.

An object that expresses whirlwind is generated based on the 3D form and texture of the whirlwind object, and located in the 3D map as shown in FIG. 17. At this time, in order to express the movement of the whirlwind object, the located position of the whirlwind object is updated such that it moves at random according to a predetermined speed, each time the object location calculation part 802 calculates the location of the operatable object, until the weather object generating part 973 newly reads information specifying the local weather models (until the local weather models are updated).

Hereinabove, the weather object locating part 809 has been described.

Next, operation of the software configuration for making the flight simulation game realized on the entertainment apparatus 1 will be described.

Figure 18:
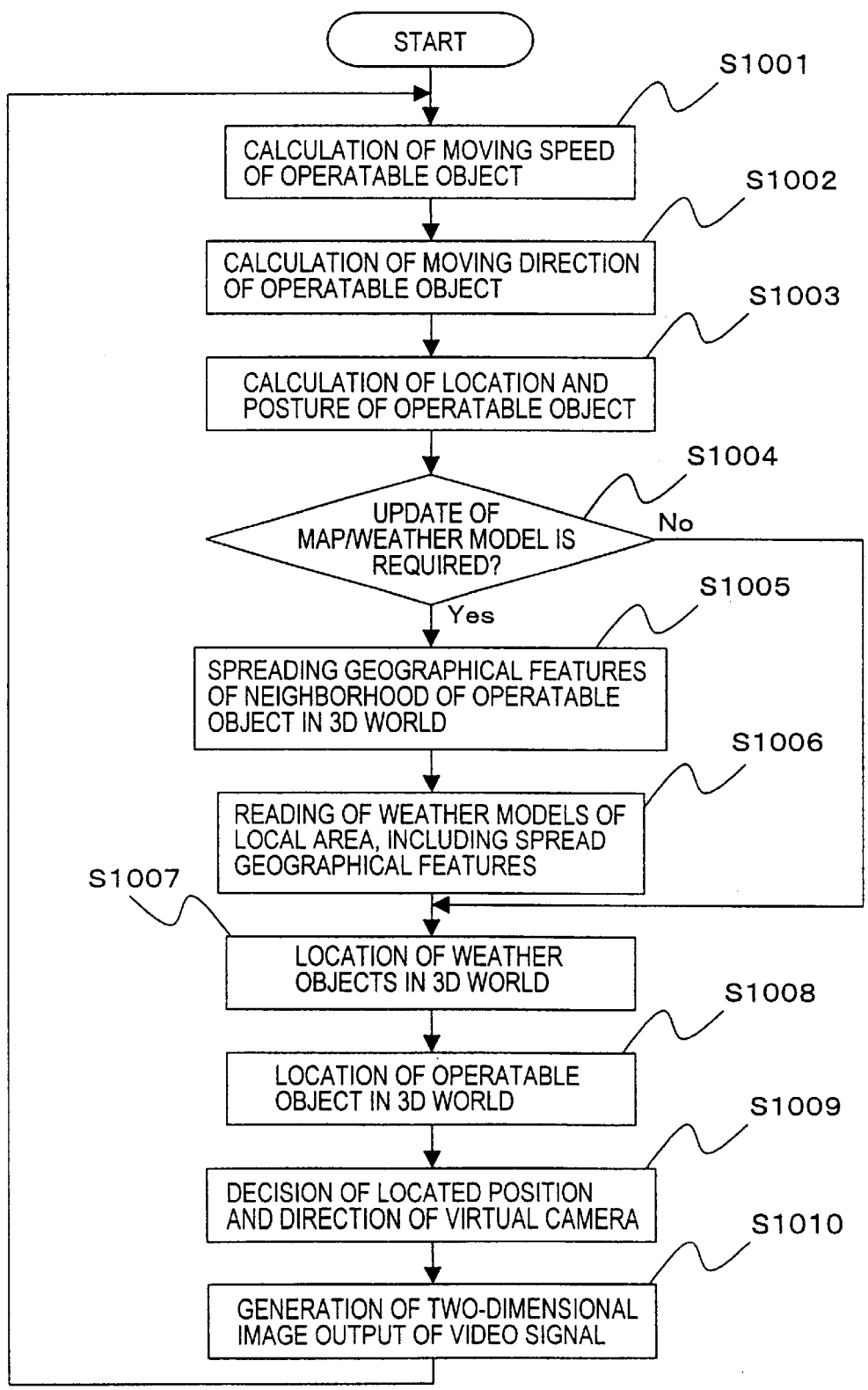
FIG. 18 is a flowchart for explaining operation of the software configuration shown in FIG. 6 for making a flight simulation game realized on the entertainment apparatus 1.

FIG. 18 is a flowchart for explaining operation of the software configuration for making the flight simulation game realized on the entertainment apparatus 1.

First, the operation contents reception part 801 calculates the moving speed of the operatable object 601 (Step S1001). In detail, by detecting the detection signal of the button to which the role of a throttle is given in the operating unit 20, throttle-on/off time from calculation of the last-moving speed is measured. Then, a speed obtained from the measured throttle-on time and the predetermined rate of acceleration is added to the last-calculated moving speed, and/or a speed obtained from the measured throttle-off time and the predetermined rate of deceleration is subtracted from the last-calculated moving speed, to calculate the moving speed of the operatable object 601.

Next, the operation contents reception part 801 calculates the moving direction of the operatable object 601 (Step S1002). In detail, in accordance with a coordinate values in the X-Y coordinate system indicated by a signal outputted from the operating unit 20 owing to operation applied to the operating shafts 31*a* and 32*a,* the lateral inclination of the airplane expressed by the operatable object 601 and rise or fall of the nose of that airplane are decided. Then, the moving direction of the operatable object 601 is decided by assuming that the airplane is inclined laterally and vertically at the above-decided angles from the last-calculated moving direction of the operatable object 601.

Next, the object location calculation part 802 calculates the location and posture of the operatable object in the virtual 3D world (Step S1003). In detail, the location of the operatable object 601 at present is calculated from the last-calculated location of the operatable object and the newest moving speed of the operatable object 601 calculated by the operation contents reception part 801. Further, the posture of the operatable object 601 at present is calculated in accordance with the newest moving direction of the operatable object 601 decided by the operation contents reception part 801.

Next, the 3D map generating part 803 examines if it is necessary to update the map (Step S1004). For example, in the case where the map is updated once in N times the processing of Step S1003 for calculating the location of the operatable object 601 is performed, a counter is provided and it is examined if the count reaches N. When it reaches N, it is judged that update is needed, and the count is reset, to proceed to Step S1005. On the other hand, when the count does not reach N, the count is incremented by one before proceeding to Step S1007.

In Step S1005, the 3D map generating part 803 reads map components to be arranged in the neighborhood of the location of the operated object calculated by the object location calculation part 802 in Step S1003, and arranges those map components in the 3D world. As a result, the suitable geographical features are spread in the neighborhood of the operatable object.

In Step S1006, the weather object locating part 809 specifies the local area 956 that includes the area of the 3D map generated by the 3D map generating part 803 in Step S1005 (i.e., area in the neighborhood of the location of the operatable object calculated by the object location calculation part 802), and obtains the local weather models set for the specified local area 956 from the local weather model generating part 909. Then, various information for specifying the 3D form and texture of the weather objects expressed by the obtained local weather models is read from the weather object DA 504.

Here, in thus-described flow, the updating of the map by the 3D map generating part 803 and the reading of the local weather models by the weather object locating part 809 are made at the same timing. However, the present invention is not limited to this. For example, it is possible that the map is updated once in N times the calculation of the location of the operatable object is performed in Step S1003 and the local weather models are read once in N/2 times the same calculation is performed.

Next, for each of the local weather models read in Step S1006, the weather object locating part 809 generates the weather object expressed by that local weather model, based on the strength and size of the local weather model and various information for specifying the 3D form and texture of the weather object expressed by that local weather model. Then, thus-generated weather object is located in the 3D world in which geographical features are spread by the 3D generating part 803, considering the strength and direction of the wind expressed by the wind model, if necessary (Step S1007).

Next, the operatable object locating part 804 locates the operatable object 601, which is specified in its 3D form etc. according to the operatable object DA 502, in the location of the operatable object calculated by the object location calculation part 802 in Step S1005, in the 3D world in which the geographical features are spread by the 3D map generating part 803. At this time, the operatable object is located such that the posture of the operatable object becomes the posture calculated by the object location calculation part 802 in Step S1005.

Next, the camera locating part 805 performs processing for setting the located position and direction of the virtual camera used for generating a two-dimensional image from the virtual 3D world in which the geographical features, weather objects, and operatable object are located by the above-described processing (Step S1009).

When the geographical features, weather objects, and operatable object are located in the 3D world and the located position and direction of the virtual camera are set as described above, then, the image generating part 806 performs rendering processing in which the geographical features, weather object, and operatable object located in the 3D world are projected onto the virtual camera screen, assuming the located portion of the virtual camera as the viewpoint and direction of the camera as the direction of the direction of the sight line. This processing generates a two-dimensional image. Then, the display control part 807 converts the two-dimensional image generated by the image generating part 806 into a video signal, and outputs the video signal to the display unit connected to the present entertainment apparatus 1 (Step S1010).

By repeating the above-described flow shown in FIG. 18, the present entertainment apparatus 1 displays CG animation on the screen of the display unit connected to the entertainment apparatus 1. That CG animation is obtained by the virtual camera photographing the operatable object 601 moving in the virtual 3D world according to contents of player's operation received through the operating unit 20. Further, weather phenomena such as cloud, rain, and wind are reflected in an image of the CG animation displayed on the screen of the display unit.

Next, in the software configuration for making up the flight simulation game realized on the entertainment apparatus 1, operation of the weather deciding part 808 will be described.

Figure 19:
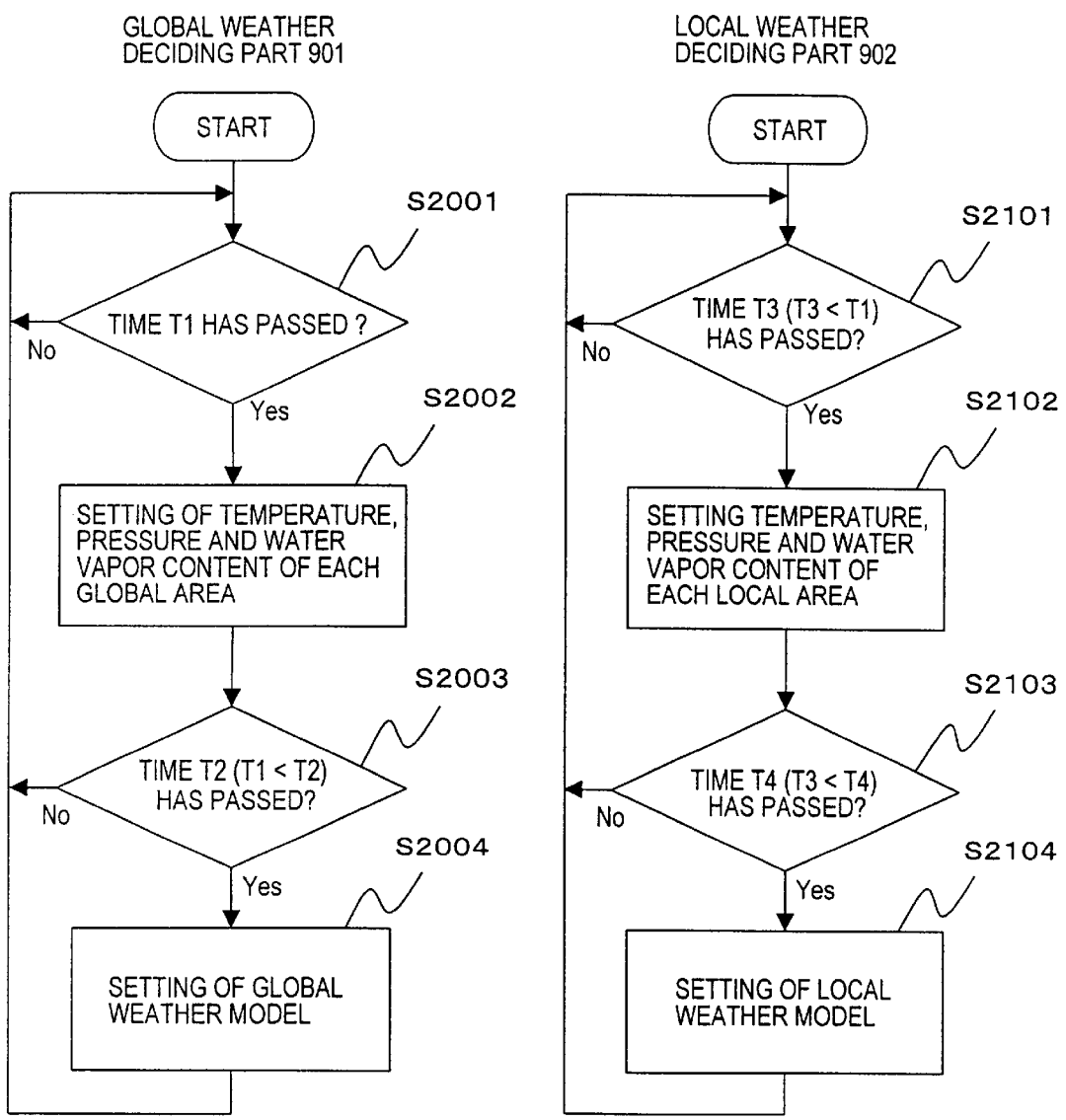
FIG. 19 is a flowchart for explaining operation of the weather deciding part 808 in the software configuration shown in FIG. 6 for making a flight simulation game realized on the entertainment apparatus 1.

FIG. 19 is a flowchart for explaining operation of the weather deciding part 808 in the software configuration for making up the flight simulation game realized on the entertainment apparatus 1.

In the global weather deciding part 901, the temperature/pressure/water-vapor-content deciding part 905 decides the temperature, pressure and water vapor content in each global area 952 at predetermined time T1 intervals in the above-described manner (Steps S2001 and S2002). The global weather model generating part 906 sets the global weather models located in each global area 952 at time T2 intervals in the above-described manner, in which the time T2 is longer than the time T1 (Steps S2003 and S2004).

On the other hand, in the local weather deciding part 902, the temperature/pressure/water-vapor-content deciding part 908 decides the temperature, pressure and water vapor content in each local area 956 of each global area 952 at time T3 intervals in the above-described manner, in which the time T3 is shorter than the time T1 (Steps S2101 and S2102). The local weather model generating part 909 sets the local weather models located in each local area 956 at time T4 intervals in the above-described manner, in which the time T4 is longer than the time T3 (provided that T4<T2) (Steps S2103 and S2104).

Hereinabove, the embodiment of the present invention has been described.

According to the present embodiment, the weather of an arbitrary local area 956 of an arbitrary global area 952 is decided based on the weather given to the global area 952 in question, and the local area information given to the local area in question in advance. Thus, the weather of an arbitrary local area 956 can be decided taking the local area information of the local area 956 in question into consideration, while correlating the weather of that local area 956 with the adjacent local areas 956 in the neighborhood of the local area 956 in question. Further, according to the present embodiment, the weather of an arbitrary global area 952 is decided based on a condition (quantity of sunshine per a unit time at current date and time of the global area 952 in question) decided by an event that generally appears and cyclically changes in the real world, and based on the global area information given to that global area 952 in advance. Thus, the weather of each local area 956 can be changed cyclically similarly to the real world.

Owing to this, it is possible to give more reality to the weather phenomena that are reflected on an image displayed on the screen of the display unit and on the operability of the operatable object, for example, by deriving those weather phenomena from the weather that is set for the local area 952 contained in the image in question.

The present invention is not limited to the above-described embodiment, and can be variously modified within its gist.

For example, in the above embodiment, the temperature/pressure/water-vapor-content deciding part 905 in the global weather deciding part 901 feeds back only the effects of the rain/snow model generated by the local weather deciding part 902 to the decision of the water vapor content of each global area 952. However, the present invention is not limited to this. For example, the effects of the cloud model generated by the local weather deciding part 902 may be fed back to the decision of the temperature/pressure of each global area 952, to give more reality to weather variation in each global area 952.

Further, the above embodiment has been described taking an example of the case in which the present entertainment apparatus 1 is used to play a flight simulation game. However, the present invention is not limited to this. For example, the present invention can be applied to various television games, such as a drive simulation game, using the present entertainment apparatus 1, in which an operatable object can be moved in a virtual 3D world in accordance with contents of player's operation received through the operating unit 20. Further, for example, even in the case where an image, which is obtained by a virtual camera photographing an arbitrary area of a virtual world, is only displayed on a screen of a display unit, it is possible to give more reality to weather phenomena reflected in the image taken by the camera. Thus, an unprecedented entertainment apparatus can be realized.

Further, according to the above embodiment, the weather of the local area 956 is reflected on an image displayed on the screen of the display unit and on the operability of the operatable object. However, the present invention is not limited to this. For example, the sound system 70 may generate and output sound (for example, the sound of thunder) reflecting the weather of the local area 956 contained in the image displayed on the screen of the display unit.

Figure 2:
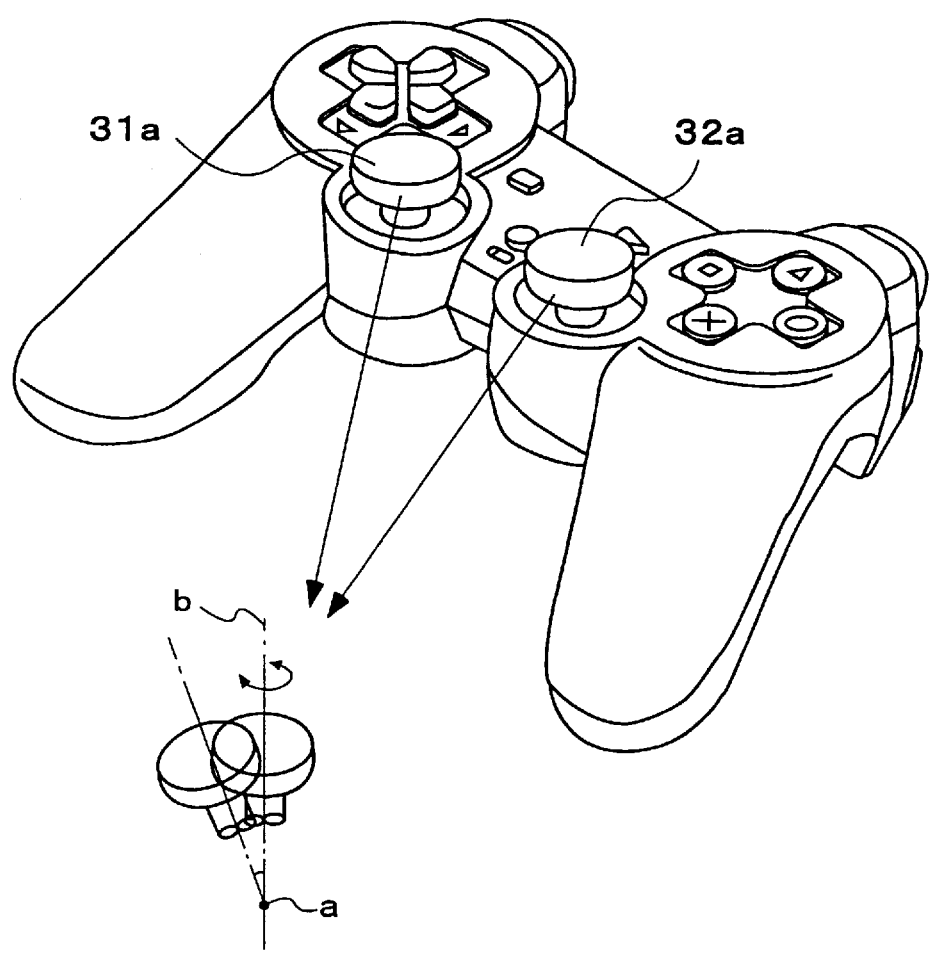
FIG. 2 is a view showing the operating unit 20 of FIG. 1.

Further, the outward appearance and hardware configuration of the entertainment apparatus 1 are not limited to the ones shown in FIGS. 1, 2 and 4. For example, the entertainment apparatus 1 may have structure of a general computer, comprising a CPU, a memory, an external storage such as a hard disk unit, a reader for reading data from a portable storing medium such as a CD-ROM or DVD-ROM, an input unit such as a keyboard and a mouse, a display unit such as a CRT and an LCD, a data communication unit for communication through a network such as Internet, an interface for handling transmission and reception of data between the above-mentioned various components, and the like. In this case, a program for realizing the software configuration shown in FIG. 6 on the entertainment apparatus 1 or various data for specifying forms and the like of the map components, operatable object, and weather objects located in the 3D world may be read from a portable storage medium through the reader and stored into the memory or the external storage, or may be downloaded from the network through the data communication unit and stored into the memory or the external storage.

As described above, according to the present invention, it is possible to give more reality to weather phenomena reflected on an image displayed on a screen of a display unit and on operability of an operatable object, and thereby to increase the entertainingness.

What is claimed is:

1. An entertainment apparatus that displays a dynamic image, which is obtained by a virtual camera photographing an operatable object moving in a virtual world in accordance with contents of player's operation received through an operating unit, on a screen of a display unit, said entertainment apparatus comprising:

a global weather deciding means for deciding weather at predetermined time intervals in each global area obtained by dividing a map expressing whole of said virtual world into a plurality of global areas, said weather being decided in accordance with a behavior model that sets a condition for the global area in question and in consideration of area information given in advance to said global area, with said condition being decided from a cyclically-changing event;

a local weather deciding means for deciding weather at predetermined time intervals in each local area obtained by dividing each global area into a plurality of local areas, said weather being decided in accordance with weather of the global area in question, and in consideration of area information given in advance to the local area in question, with said weather of the global area being decided by said global weather deciding means; and an image reflecting means for obtaining weather of a local area that includes a location of the operatable object, from said local weather deciding means, and for reflecting the obtained weather on an image of the virtual world, which includes said operatable object, displayed on the screen of said display unit, with said location of the operatable object being decided by the contents of the player's operation received through the operating unit.

2. A storage medium for displaying a dynamic image, which is obtained by a virtual camera photographing an operatable object moving in a virtual world in accordance with contents of player's operation received through an operating unit, on a screen of a display unit, wherein said program is read by a computer from said storage medium and executed so as to establish;

a global weather deciding means for deciding weather at predetermined time intervals in each global area obtained by dividing a map expressing whole of said virtual world into a plurality of global areas, said weather being decided in accordance with a behavior model that sets a condition for the global area in question, and in consideration of area information given in advance to said global area, with said condition being decided from a cyclically-changing event;

a local weather deciding means for deciding weather at predetermined time intervals in each local area obtained by dividing each global area into a plurality of local areas, said weather being decided in accordance with weather of the global area in question, and in consideration of area information given in advance to the local area in question, with said weather of the global area being decided by said global weather deciding means; and an image reflecting means for obtaining weather of a local area that includes a location of the operatable object, from said local weather deciding means, and for reflecting the obtained weather on an image of the virtual world, which includes said operatable object, displayed on the screen of said display unit, with said location of the operatable object being decided by the contents of the player's operation received through the operating unit, on said computer.

3. The storage medium according to claim 2, wherein:

said program is read by the computer from said storage medium and executed so as to further establish an operation reflecting means on said computer, said operation reflecting means obtaining weather of a local area that includes a location of the operatable object, from said local weather deciding means, and reflecting the obtained weather on movement of the operatable object in the virtual world, said movement being caused by said operating unit.

4. The storage medium according to claim 2, wherein:

said global weather deciding means decides weather in each global area at intervals of a first time; and said local weather deciding means decides weather in each local area at intervals of a second time shorter than that of said first time.

5. The storage medium according to claim 2, wherein:

said condition that is set for each global area by said behavior model and decided from a cyclically-changing event is quantity of sunshine per a unit time in each date and time in each global area, said quantity of sunshine being decided by one year fluctuation of quantity of sunshine owing to revolution of the earth and one day fluctuation of quantity of sunshine owing to rotation of the earth.

6. The storage medium according to claim 5, wherein:

said global weather deciding means comprises:

a first means for deciding a temperature, pressure and water vapor content in each global area at predetermined time intervals, based on the quantity of sunshine per a unit time at a time concerned, the area information given in advance to said global area, and last-decided temperatures, pressures, and water vapor contents of the global area in question and global areas adjacent to said global area, with said quantity of sunshine being set for the global area in question by said behavior model; and a second means for generating a model expressing a global weather phenomenon located in each global area, as a global weather model, at predetermined time intervals, and based on the temperature, pressure and water vapor content in each global area, decided by said first means; and said local weather deciding means comprises:

a third means for deciding a temperature, pressure and water vapor content in each local area at predetermined intervals, based on the temperature, pressure and water vapor content of a global area to which the local area in question belongs, the model information given in advance to said local area, and last-decided temperatures, pressures and water vapor contents of the local area in question and local areas adjacent to said local area with the temperature, pressure and water vapor content of said global area being decided by said first means; and a fourth means for generating a model expressing a local weather phenomenon located in each local area, as a local weather model, at predetermined time intervals, and based on the temperature, pressure and water vapor content in each local area, decided by said third means, the area information given in advance to said local area, and the global weather model located in said local area by said second means.

7. The storage medium according to claim 6, wherein:
said first means comprises:
   a means for deciding a temperature in each global area, based on a temperature variation per a unit time in said global area and last-decided temperatures of said global area and global areas adjacent to said global area, with said temperature variation being decided based on the quantity of sunshine per a unit time at a time concerned and the area information given to said global area, and with said quantity of sunshine being set for the global area in question by said behavior model;
a means for deciding a pressure in each global area, based on the temperature given to the global area in question by said means for deciding a temperature in each global area; and
a means for deciding a water vapor content in each global area, based on a generated water vapor generated per a unit time in the global area in question, last-decided water vapor contents of said global area and global areas adjacent to said global area, and a saturated vapor decided from the temperature/pressure given to said global area by said means for deciding a temperature/pressure, with said generated water vapor being decided based on the quantity of sunshine per a unit time at a time concerned set for said global area by said behavior model, and the area information given to said global area.

8. The storage medium according to claim 6, wherein:
said second means sets a global weather model expressing a high or low pressure area such that, in locating pressure lines in said map expressing whole of the virtual world using pressure of each global area given by said first means, when there is a part whose pressure is higher than a pressure in the neighborhood and a rate of pressure change is larger than a predetermined value, said second means sets said part as a global weather model expressing a high pressure area, and when there is a part whose pressure is lower than a pressure in the neighborhood and a rate of pressure change is larger than a predetermined value, said second means sets said part as a global weather model expressing a low pressure area.

9. The storage medium according to claim 8, wherein:
said second means sets a global weather model expressing an air current based on the global weather model expressing a high/low pressure area located in said virtual world, and on a preset deflecting force in advance.

10. The storage medium according to claim 6, wherein:
said third means comprises:
   a means for deciding a temperature in each local area, based on a temperature of a global area to which said local area belongs, the area information given in advance to said local area, and last-decided temperatures of said local area and local areas adjacent to said local area, with said temperature of the global area being decided by said first means;
   a means for deciding a pressure in each local area, based on the temperature given to said local area by said means for deciding a temperature in each local area; and
   a means for deciding a water vapor content in each local area, based on a water vapor content of a global area to which said local area belongs, last-decided water vapor contents of local model and local areas adjacent to said local area, and a saturated vapor decided from the temperature/pressure given to said local area by said means for deciding a temperature/pressure, with said water vapor content of the global area being decided by said first means.

11. The storage medium according to claim 6, wherein:
said fourth means sets a local weather model expressing cloud for each local area, based on a humidity of said local model decided from the temperature/pressure and water vapor content in said local area, the area information given in advance to said local area, and a global weather model located in said local area, when said humidity is more than or equal to a predetermined value, with said temperature/pressure and water vapor content being decided by said third means.

12. The storage medium according to claim 11, wherein:
said fourth means sets a local weather model expressing rain or snow for each local area when the local weather model expressing cloud is located in said local area such that, when the humidity of said local area decided from the temperature/pressure and water vapor content in said local area is more than or equal to a predetermined value, and the humidity of said local area is more than or equal to a predetermined value, said fourth means sets a local weather model expressing rain for said local area, and when the humidity of said local area is more than or equal to a predetermined value and the temperature of said local area is less than a predetermined value, said fourth means sets a local weather model expressing snow.

13. The storage medium according to claim 6, wherein:
said fourth means sets a local weather model expressing wind located in each local area, based on pressures of said local area and local areas adjacent to said local area, the area information given in advance to said local area, and the global weather model expressing an air current located in said local area.

14. The storage medium according to claim 6, wherein:
said image reflecting means obtains a local area model located in a local area that includes the location of the operatable object, from said fourth means, and reflects a weather phenomenon specified by the obtained local weather model on the image of the virtual world, which includes said operatable object, displayed on the screen of said display unit, with said location of the operatable object being decided by the contents of the player's operation received through the operating unit.

15. A method of displaying an object, in which a dynamic image obtained by a virtual camera photographing an operatable object moving in a virtual world in accordance with contents of player's operation received through an operating unit is displayed on a screen of a display unit, comprising steps of:
   deciding global weather at predetermined time intervals in each global area obtained by dividing a map expressing whole of said virtual world into a plurality of global areas, said global weather being decided in accordance with a behavior model that sets a condition for the global area in question and in consideration of the area information given in advance to said global area, with said condition being decided from a cyclically-changing event;

deciding local weather at predetermined time intervals in each local area obtained by dividing each global area into a plurality of local areas, said local weather being decided in accordance with weather of said global area in question decided by said step of deciding global weather and in consideration of the area information given in advance to said local area; and reflecting weather of a local area that includes a location of the operatable object, out of the weather of local areas decided by the step of deciding local weather, on an image of the virtual world, which includes said operatable object, displayed on the screen of said display unit, with said location of the operatable object being decided by the contents of the player's operation received through the operating unit.

16. A program for displaying a dynamic image obtained by a virtual camera photographing an operatable object moving in a virtual world in accordance with contents of player's operation received through an operating unit, on a screen of a display unit, wherein said program is stored in a storage unit and read by a computer from said storage unit to be execute so as to establish;

a global weather deciding means for deciding weather at predetermined time intervals in each global area obtained by dividing a map expressing whole of said virtual world into a plurality of global areas, said weather being decided in accordance with a behavior model that sets a condition for the global area in question, and in consideration of area information given in advance to said global area, with said condition being decided from a cyclically-changing event;

a local weather deciding means for deciding weather at predetermined time intervals in each local area obtained by dividing each global area into a plurality of local areas, said weather being decided in accordance with weather of the global area in question, and in consideration of area information given in advance to the local area in question, with said weather of the global area being decided by said global weather deciding means; and an image reflecting means for obtaining weather of a local area that includes a location of the operatable object, from said local weather deciding means, and for reflecting the obtained weather of the local area on an image of the virtual world, which includes said operatable object, displayed on the screen of said display unit, with said location of the operatable object being decided by the contents of the player's operation received through the operating unit.

* * * * *